United States Patent
Harada et al.

(10) Patent No.: US 10,505,186 B2
(45) Date of Patent: *Dec. 10, 2019

(54) ACTIVE MATERIAL, NONAQUEOUS ELECTROLYTE BATTERY, BATTERY PACK AND BATTERY MODULE

(71) Applicant: Kabushiki Kaisha Toshiba, Minato-ku (JP)

(72) Inventors: Yasuhiro Harada, Isehara (JP); Norio Takami, Yokohama (JP); Kazuki Ise, Fuchu (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 528 days.

This patent is subject to a terminal disclaimer.

(21) Appl. No.: 15/010,068

(22) Filed: Jan. 29, 2016

(65) Prior Publication Data

US 2016/0226067 A1    Aug. 4, 2016

(30) Foreign Application Priority Data

Jan. 30, 2015  (JP) ................. 2015-017227

(51) Int. Cl.
  *H01M 4/485*    (2010.01)
  *H01M 4/36*     (2006.01)
  (Continued)

(52) U.S. Cl.
  CPC ......... *H01M 4/485* (2013.01); *H01M 2/1016* (2013.01); *H01M 4/366* (2013.01); *H01M 2004/027* (2013.01)

(58) Field of Classification Search
  CPC .... H01M 4/131; H01M 4/485; H01M 2/1016; H01M 4/366; H01M 2004/027;
  (Continued)

(56) References Cited

U.S. PATENT DOCUMENTS 5,478,674 A    12/1995  Miyasaka
6,075,346 A     6/2000  Kikuchi et al.
(Continued)

FOREIGN PATENT DOCUMENTS

CN    101154729 A    4/2008
CN    102544446      7/2012
(Continued)

OTHER PUBLICATIONS

Wu, Hongbin, et al. "Sr-doped Li4Ti5O12 as the anode material for lithium-ion batteries."; Solid State Ionics; 232 (2013): 13-18. (Year: 2013).*

(Continued)

*Primary Examiner* — Milton I Cano
*Assistant Examiner* — Philip A. Stuckey
(74) *Attorney, Agent, or Firm* — Oblon, McClelland, Maier & Neustadt, L.L.P.

(57) ABSTRACT

In general, according to one embodiment, there is provided an active material. The active material contains a composite oxide having an orthorhombic crystal structure. The composite oxide is represented by a general formula of $Li_xM1_{1-y}M2_yTi_{6-z}M3_zO_{14+\delta}$. In the general formula, M1 is at least one selected from the group consisting of Sr, Ba, Ca, and Mg; M2 is at least one selected from the group consisting of Cs, K, and Na; M3 is at least one selected from the group consisting of Al, Fe, Zr, Sn, V, Nb, Ta, and Mo; and x is within a range of $2 \leq x \leq 6$, y is within a range of $0 < y < 1$, z is within a range of $0 < z \leq 6$, and $\delta$ is within a range of $-0.5 \leq \delta \leq 0.5$.

18 Claims, 12 Drawing Sheets

(51) Int. Cl.
*H01M 2/10* (2006.01)
*H01M 4/02* (2006.01)

(58) Field of Classification Search
CPC .............. H01M 4/625; H01M 4/5825; H01M 10/0525; C01G 25/006; C01G 39/006; C01G 35/006; C01G 33/006; C01G 31/006; C01G 23/006; Y02E 60/122; C01P 2006/40; C01P 2006/12; C01P 2002/76; C01P 2002/74; C01P 2002/72; C01P 2002/52; C01P 2002/50
See application file for complete search history.

(56) References Cited

U.S. PATENT DOCUMENTS

| | | | |
|---|---|---|---|
| 7,789,796 | B2 | 9/2010 | Choi |
| 9,812,704 | B2 | 11/2017 | Inagaki et al. |
| 2002/0182488 | A1 | 12/2002 | Cho et al. |
| 2004/0131941 | A1 | 7/2004 | Belharouak et al. |
| 2004/0185347 | A1 | 9/2004 | Kim et al. |
| 2004/0202934 | A1 | 10/2004 | Zaghib et al. |
| 2007/0148545 | A1 | 6/2007 | Amine et al. |
| 2008/0078594 | A1* | 4/2008 | Harada ............. B60L 11/123 429/122 |
| 2008/0226985 | A1 | 9/2008 | Nobuta et al. |
| 2009/0042095 | A1 | 2/2009 | Inagaki et al. |
| 2009/0104533 | A1 | 4/2009 | Takeuchi et al. |
| 2009/0286157 | A1 | 11/2009 | Chen et al. |
| 2009/0305132 | A1 | 12/2009 | Gauthier et al. |
| 2011/0121240 | A1 | 5/2011 | Amine et al. |
| 2011/0217593 | A1 | 9/2011 | Dollinger et al. |
| 2011/0269021 | A1 | 11/2011 | Fu et al. |
| 2011/0293507 | A1* | 12/2011 | Dambournet ........ C01G 23/003 423/598 |
| 2012/0070744 | A1 | 3/2012 | Moriyama et al. |
| 2012/0081070 | A1 | 4/2012 | Wook et al. |
| 2012/0225346 | A1 | 9/2012 | Hoshina et al. |
| 2012/0328930 | A1* | 12/2012 | Inagaki ............. H01M 4/485 429/163 |
| 2013/0209897 | A1 | 8/2013 | Paranthaman et al. |
| 2013/0260210 | A1 | 10/2013 | Takami et al. |
| 2014/0001401 | A1 | 1/2014 | Watanabe et al. |
| 2014/0295231 | A1 | 1/2014 | Ise et al. |
| 2014/0306149 | A1 | 10/2014 | Tarascon et al. |
| 2014/0312269 | A1 | 10/2014 | Laumann et al. |
| 2014/0356725 | A1 | 12/2014 | Zaghib et al. |
| 2015/0010820 | A1 | 1/2015 | Takami et al. |
| 2015/0076750 | A1* | 3/2015 | Huang ............. H01M 4/485 264/618 |
| 2015/0255789 | A1 | 9/2015 | Bi et al. |
| 2015/0333326 | A1 | 11/2015 | Lee et al. |
| 2016/0226067 | A1 | 8/2016 | Harada et al. |
| 2016/0268592 | A1 | 9/2016 | Inagaki et al. |
| 2016/0268603 | A1 | 9/2016 | Harada et al. |
| 2016/0276650 | A1 | 9/2016 | Hoshina et al. |
| 2017/0005322 | A1 | 1/2017 | Harada et al. |
| 2017/0069910 | A1 | 3/2017 | Harada et al. |
| 2017/0077508 | A1 | 3/2017 | Hoshina et al. |
| 2017/0077509 | A1 | 3/2017 | Ise et al. |
| 2017/0162872 | A1* | 6/2017 | Takami ............. H01M 4/131 |

FOREIGN PATENT DOCUMENTS

| | | | |
|---|---|---|---|
| CN | 102969492 | | 3/2013 |
| CN | 103811738 | | 5/2014 |
| CN | 105185972 | | 12/2015 |
| CN | 106575754 | | 4/2017 |
| EP | 2 784 855 | | 10/2014 |
| EP | 3 145 004 | | 3/2017 |
| EP | 3 229 296 | A1 | 10/2017 |
| JP | 6-310143 | A | 11/1994 |
| JP | 10-208747 | A | 8/1998 |
| JP | 2001143702 | | 5/2001 |
| JP | 2005-267940 | A | 9/2005 |
| JP | 4237659 | B2 | 9/2005 |
| JP | 2007-227199 | A | 9/2007 |
| JP | 2008-91079 | A | 4/2008 |
| JP | 2008-542979 | A | 11/2008 |
| JP | 2009-43679 | A | 2/2009 |
| JP | 2010-123424 | A | 6/2010 |
| JP | 2013-8493 | A | 1/2013 |
| JP | 2014-103032 | A | 6/2014 |
| JP | 2014-238960 | A | 12/2014 |
| JP | 2015-35420 | A | 2/2015 |
| JP | 2015-46218 | | 3/2015 |
| JP | 2015046218 | | 3/2015 |
| KR | 10-2014-0117273 | A | 10/2014 |
| WO | 2017073765 | | 5/1917 |
| WO | 2012/002364 | | 6/2011 |
| WO | 2912992364 | | 1/2012 |
| WO | WO 2016/088193 | A1 | 6/2016 |
| WO | WO-2016088193 | A1 * | 6/2016 ............ H01M 4/131 |
| WO | 2017/073765 | | 5/2017 |

OTHER PUBLICATIONS

Koseva, Iovka, et al. "A new family of isostructural titanates, MLi2Ti6O14 (M=Sr, Ba, Pb)." Journal of alloys and compounds 389.1-2 (2005): 47-54.APA (Year: 2005).*

Author-et al, "Funmatsu X Sen Kaisetsu no Jissai", Reality of Power X-Ray Analysis, X-Ray Analysis Investigation Conversazuine, The Japan Society for Analytical Chemistry, written and edited by Izumi Nakai and Fujio Izumi (Asakura Publishing Co., Ltd.) 2002, pp. 97-115.

International Search Report and Written Opinion dated May 10, 2016 in PCT/JP2016/052708 with English translation of category of cited documents.

I. Belharouak, et al., "Li$_2$MTi$_6$O$_{14}$ (M=Sr, Ba): New Anodes for Lithium-ion Batteries" Electrochemistry Communications 5, 2003, pp. 435-438.

Office Action dated Jun. 9, 2017 in U.S. Appl. No. 15/066,402, filed Mar. 10, 2016.

Yin et al., "Reversible lithium storage in Na2Li2Ti6O14 as anode for lithium ion batteries", Electrochemistry Communications, vol. 11, 2009, pp. 1251-1254.

Office Action dated Jan. 31, 2017 in Korean Patent Application No. 10-2016-0027533.

Extended European Search Report dated Jul. 13, 2016 in Patent Application No. 16159127.6.

Mengmeng Lao, et al., "Preparation and electrochemical characterization of Li$_{2+x}$Na$_{2-x}$Ti$_6$O$_{14}$ (0≤x≤0.2) as anode materials for lithium-ion batteries", Ceramics International, vol. 41, XP029106099, 2015, pp. 2900-2907.

Pengfei Wang, et al., "Improved lithium storage performance of lithium sodium titanate anode by titanium site substitution with aluminum", Journal of Power Sources, vol. 293, XP055285710, 2015, pp. 33-41.

Seongjun Bae, et al., "Tunable lithium storage properties of metal lithium titanates by stoichiometric modulation", Electrochemistry Communications, 64, 2016, pp. 26-29.

Mengmeng Lao, et al., "Enhanced electrochemical properties of Mg$^{2+}$ doped Li$_2$Na$_2$Ti$_6$O$_{14}$ anode material for lithium-ion batteries", Electrochimica Acta, 196, 2016, pp. 642-652.

International Search Report dated May 10, 2016 in PCT/JP2016/052708 (submitting English language translation only).

Office Action dated Jul. 12, 2016 in Japanese Patent Application No. 2016-015626 (with unedited computer generated English translation).

Office Action dated Jul. 12, 2016 in Japanese Patent Application No. 2016-088372 (with English language translation).

Office Action dated Jul. 12, 2016 in Japanese Patent Application No. 2016-041529.

Office Action dated Jul. 12, 2016 in Japanese Patent Application No. 2016-088601 (with unedited computer generated English translation).

Extended European Search Report dated Jun. 10, 2016 in Patent Application No. 16153345.0.

(56) References Cited

OTHER PUBLICATIONS

Zonghai Chen, et al., "Titanium-Based Anode Materials for Safe Lithium-Ion Batteries" Advanced Functional Materials, vol. 23, XP001581750, 2013, pp. 959-969.

A. Detcheva, et al., "Analysis of single crystals based on strontium-lithium-titanium oxides by inductively coupled plasma atomic emission spectrometry" Spectrochimica Acta Part B, vol. 58, 2003, pp. 1481-1488.

Kaiqiang Wu, et al., "Phase composition and electrochemical performance of sodium lithium titanates as anode materials for lithium rechargeable batteries" Journal of Power Sources, vol. 275, 2015, pp. 419-428.

I. Koseva, et al., "A new family of isostructural titanates, $MLi_2Ti_6O_{14}$ (M=Sr, Ba, Pb)" Journal of Alloys and Compounds, vol. 389, 2005, pp. 47-54.

Damien Dambournet, et al., "$MLi_2Ti_6O_{14}$ (M=Sr, Ba, 2Na) Lithium Insertion Titanate Materials: A Comparative Study" Inorganic Chemistry, vol. 49, No. 6, 2010, pp. 2822-2826.

Kaigiang Wu, et al., "Copper/Carbon Coated Lithium Sodium Titanate as Advanced Anode Material for Lithium-ion Batteries", Journal of Power Sources, 2014, vol. 259, pp. 177-182.

Bin-Na Yun, et al. "Improved electrochemical performance of boron-doped carbon-coated lithium titanate as an anode material for sodium-ion batteries", Journal of Materials Chemistry A. 5, 2017, pp. 2802-2810.

B. Prihandoko, et al., "Variation of Carbon Coating on $Li_2Na_2TiO_{14}$ as Anode Material of Lithium Battery", IOP Conference Series: Materials Science and Engineering, 202, 2017, 7 pages.

What Is Carbon Black? (accessed on :Jan. 22, 2019). Retrieved from https://www.thecarycompany.com/media/pdf/sp0ecs/orion-what-is-carbon-black.pdf (Year:2015).

Kaiqiag Wu, et al., "Copper/Carbon Coated Lithium Sodium Titanate as Advanced Anode Material for Lithium-ion Batteries", Journal of Power Sources, 2014, vol. 259, pp. 177-182.

Wu et al., Journal of Power Sources, 272 (2014) 283-290 (Year:2014).

\* cited by examiner

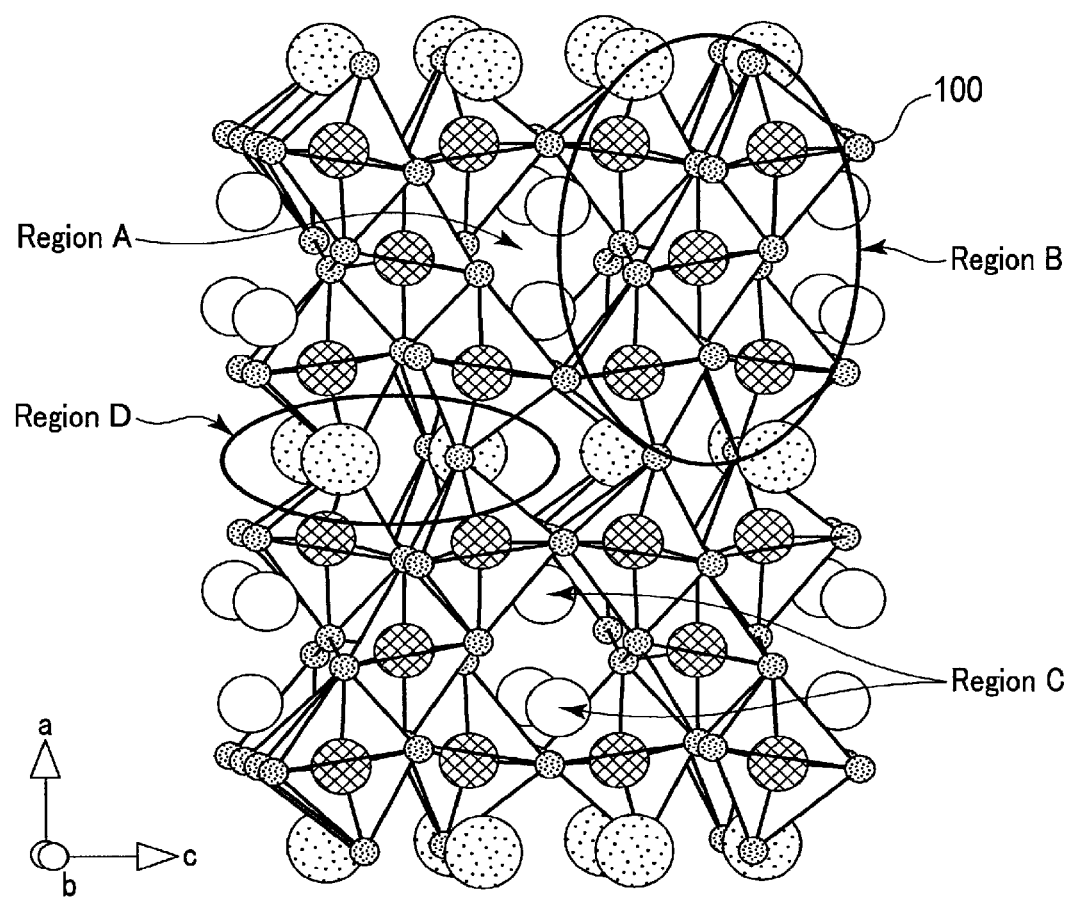
F I G. 3

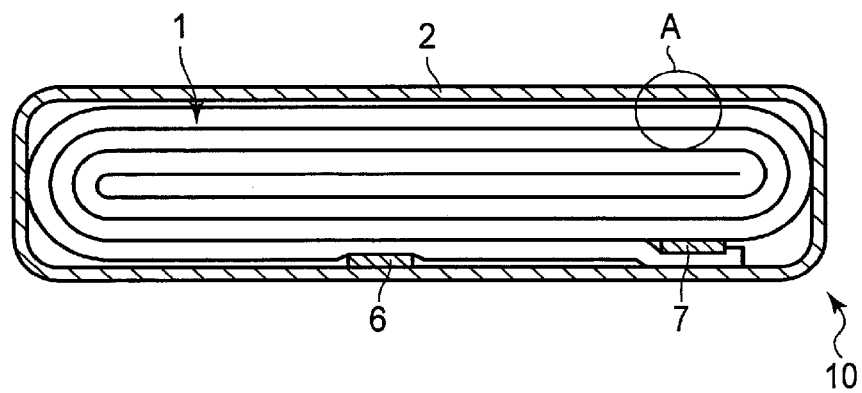
F I G. 4
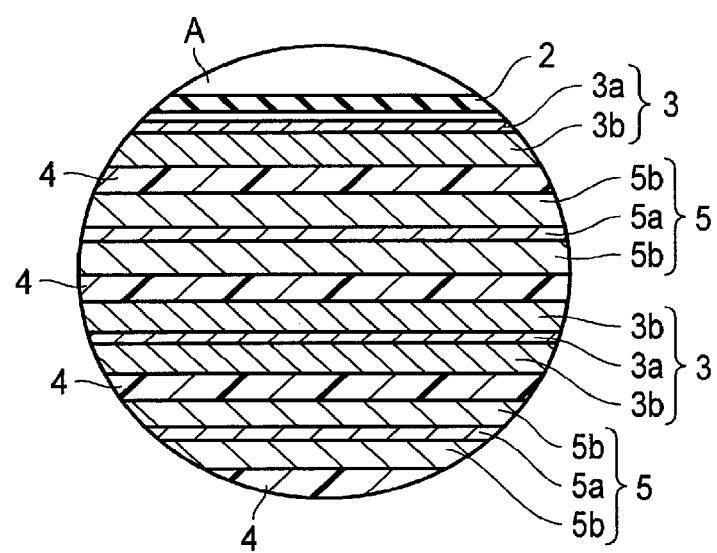
F I G. 5

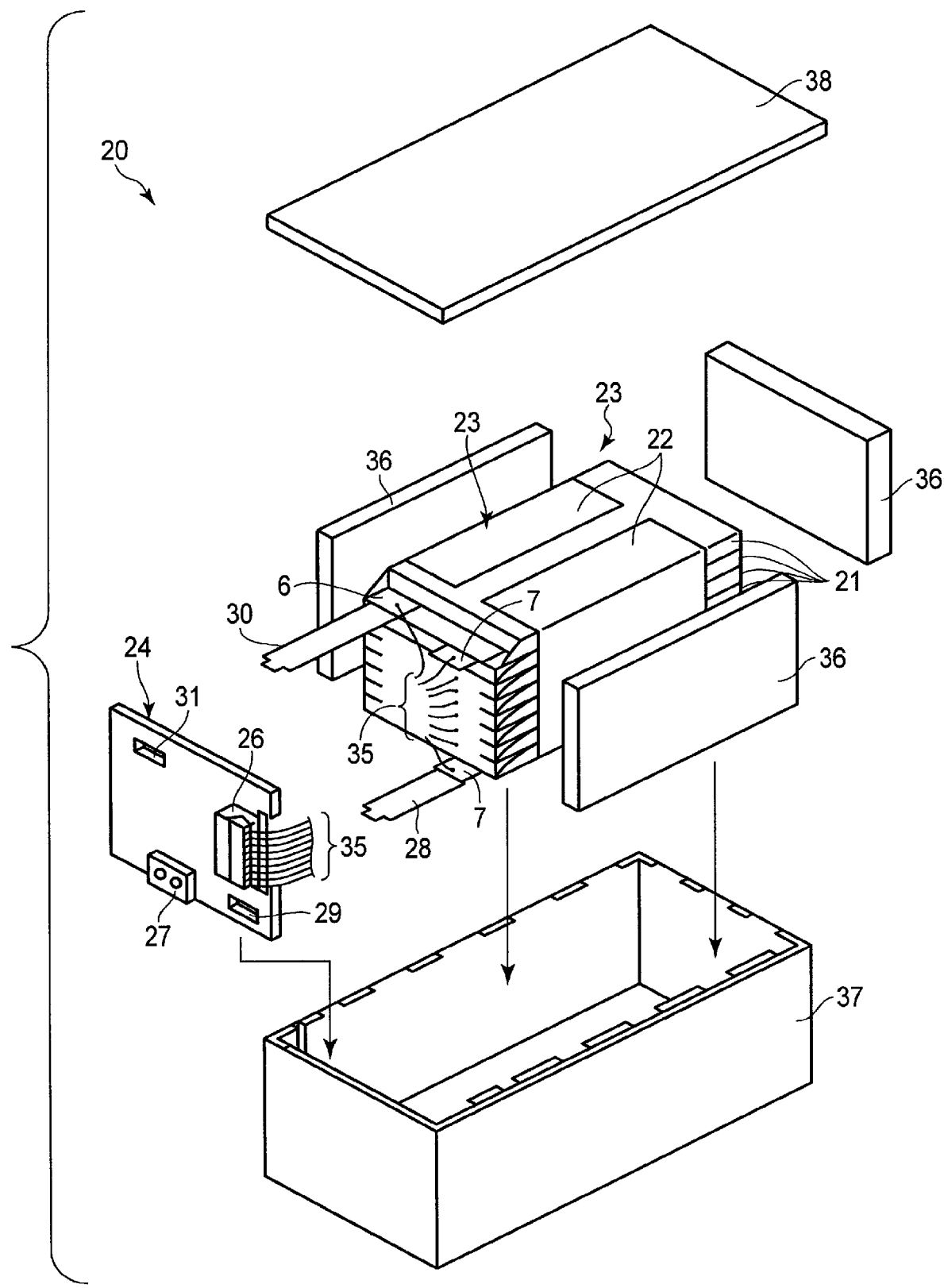
F I G. 8

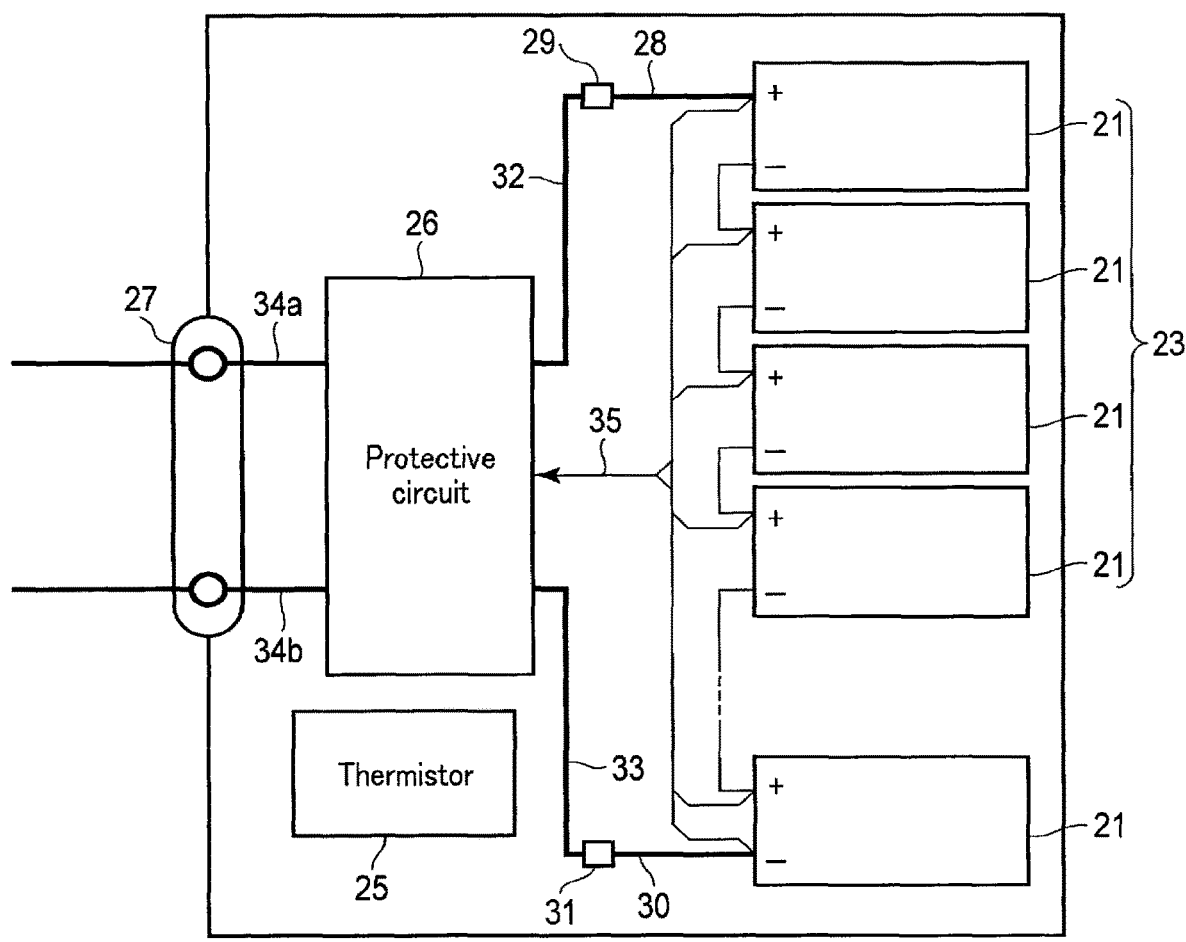
F I G. 9

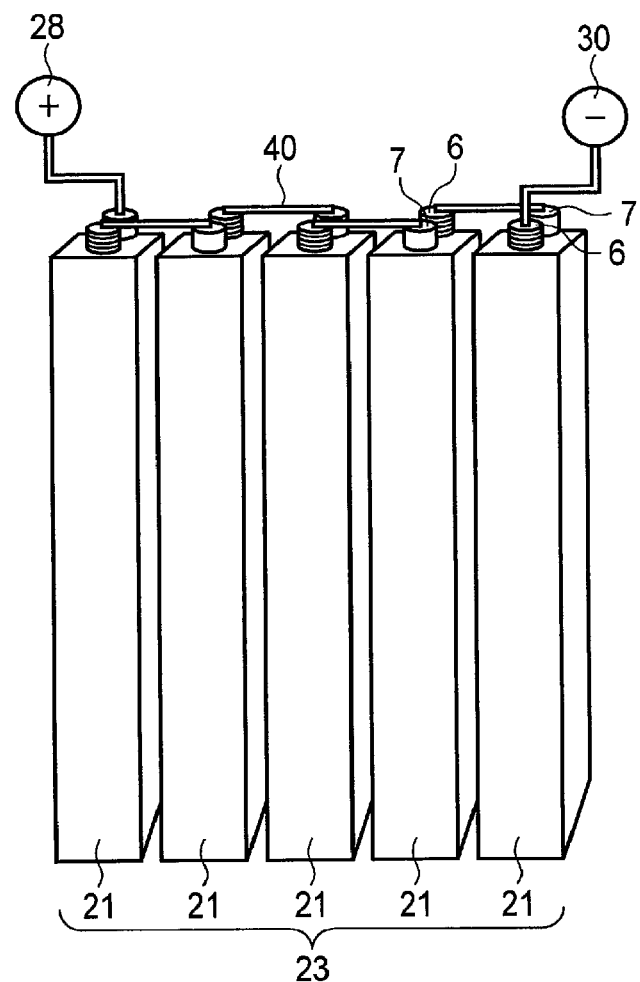
F I G. 10

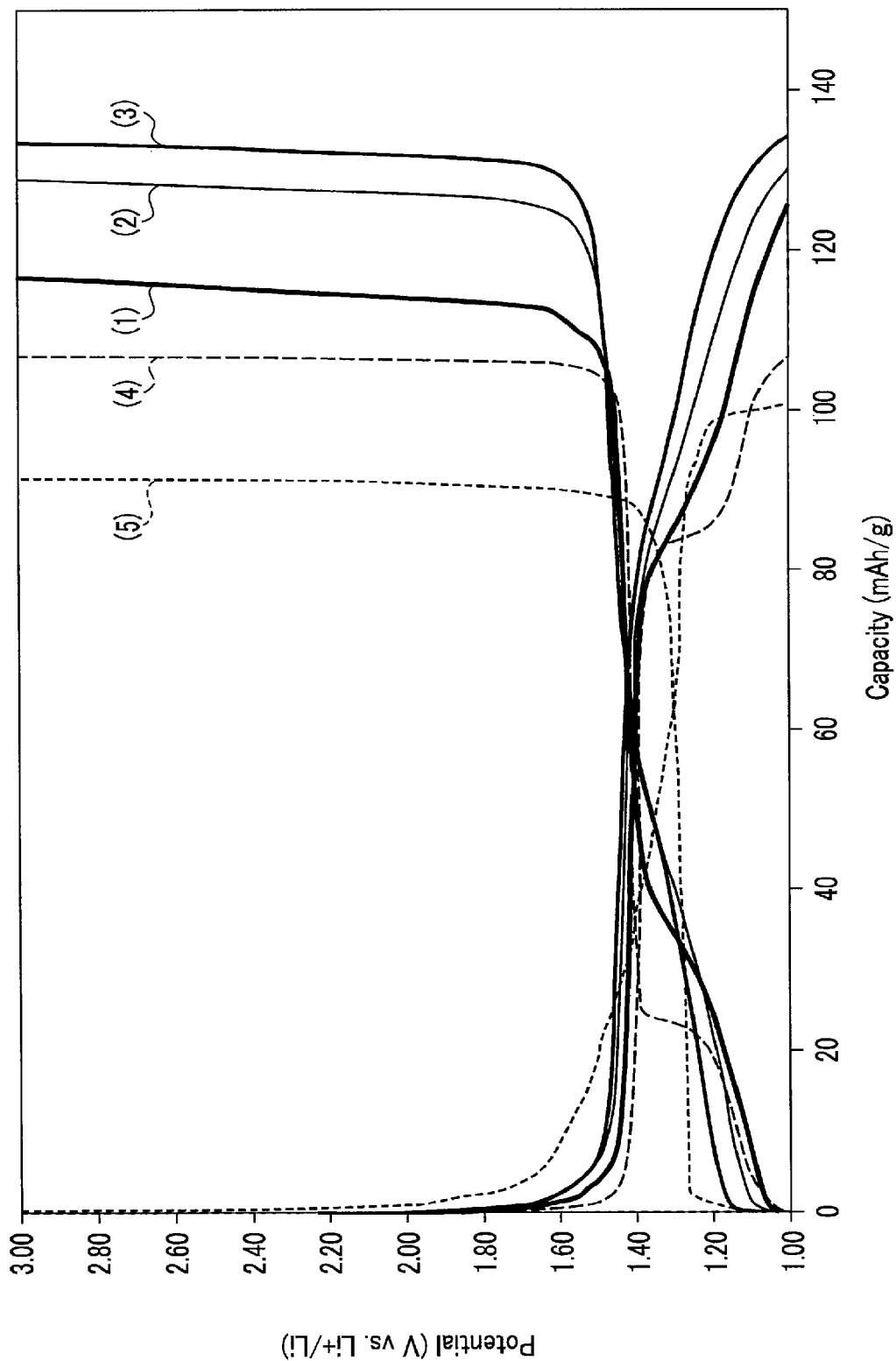
F I G. 12

ACTIVE MATERIAL, NONAQUEOUS ELECTROLYTE BATTERY, BATTERY PACK AND BATTERY MODULE

CROSS-REFERENCE TO RELATED APPLICATIONS

This application is based upon and claims the benefit of priority from the Japanese Patent Application No. 2015-017227, filed Jan. 30, 2015, the entire contents of which are incorporated herein by reference.

FIELD

Embodiments described herein relate generally to an active material for a battery, a nonaqueous electrolyte battery, a battery pack and a battery module.

BACKGROUND

Recently, a nonaqueous electrolyte battery such as a lithium ion secondary battery has been actively researched and developed as a high energy-density battery. The nonaqueous electrolyte battery is expected to be used as a power source for hybrid vehicles, electric cars, an uninterruptible power supply for base stations for portable telephone, or the like. For this, the nonaqueous electrolyte battery is desired to have a high energy density as well as to be excellent in other performances such as rapid charge-and-discharge performances and long-term reliability. For example, a nonaqueous electrolyte battery enabling rapid charge-and-discharge not only remarkably shortens a charging time but also makes it possible to improve performances related to motivity and to efficiently recover regenerative energy from motivity, in a hybrid vehicle or the like.

In order to enable rapid charge-and-discharge, electrons and lithium ions must be able to migrate rapidly between the positive electrode and the negative electrode. However, when a battery using a carbon-based negative electrode is repeatedly subjected to rapid charge-and-discharge, dendrite precipitation of metal lithium occurs on the electrode, raising the fear as to heat generation and fires caused by internal short circuits.

In light of this, a battery using a metal composite oxide in place of a carbonaceous material in the negative electrode has been developed. Particularly, in a battery using titanium oxide as the negative electrode active material, rapid charge-and-discharge can be stably performed. Such a battery also has a longer life than those using a carbonaceous material.

However, titanium oxide has a higher potential based on metal lithium than the carbonaceous material. That is, titanium oxide is nobler. Furthermore, titanium oxide has a lower capacity per weight. Therefore, a battery using titanium oxide as the negative electrode active material has a problem that the energy density is lower. Particularly, when a material having a high potential based on metal lithium is used as a negative electrode material, a battery using the material has a lower voltage than that of a conventional battery using a carbonaceous material. Therefore, when the battery is used for systems requiring a high voltage such as an electric vehicle and a large-scale electric power storage system, the battery has a problem that the battery series number is increased.

The potential of the electrode using titanium oxide is about 1.5 V based on metal lithium and is higher (nobler) than that of the negative electrode using carbonaceous material. The potential of titanium oxide is due to the redox reaction between $Ti^{3+}$ and $Ti^{4+}$ when lithium is electrochemically absorbed and released, and is therefore limited electrochemically. It is therefore conventionally difficult to drop the potential of the electrode to improve the energy density.

BRIEF DESCRIPTION OF THE DRAWINGS

FIG. 3 is a view of a crystal structure of $Li_2(Sr_{0.25}Na_{0.75})Ti_{5.25}Nb_{0.75}O_{14}$ as an example of a composite oxide having symmetry of a space group Fmmm;

FIG. 4 is a cross sectional view of a nonaqueous electrolyte battery as an example according to a second embodiment;

FIG. 5 is an enlarged cross sectional view of a portion A in FIG. 4;

FIG. 8 is an exploded perspective view of a battery pack as an example according to a third embodiment;

FIG. 9 is a block diagram showing an electric circuit of the battery pack in FIG. 8;

FIG. 10 is a schematic perspective view of a battery module as an example according to a fourth embodiment;

FIG. 12 shows charge-and-discharge curves of Examples A-4 to A-6 and Comparative Examples A-1 and A-6;

DETAILED DESCRIPTION

Figure 1:
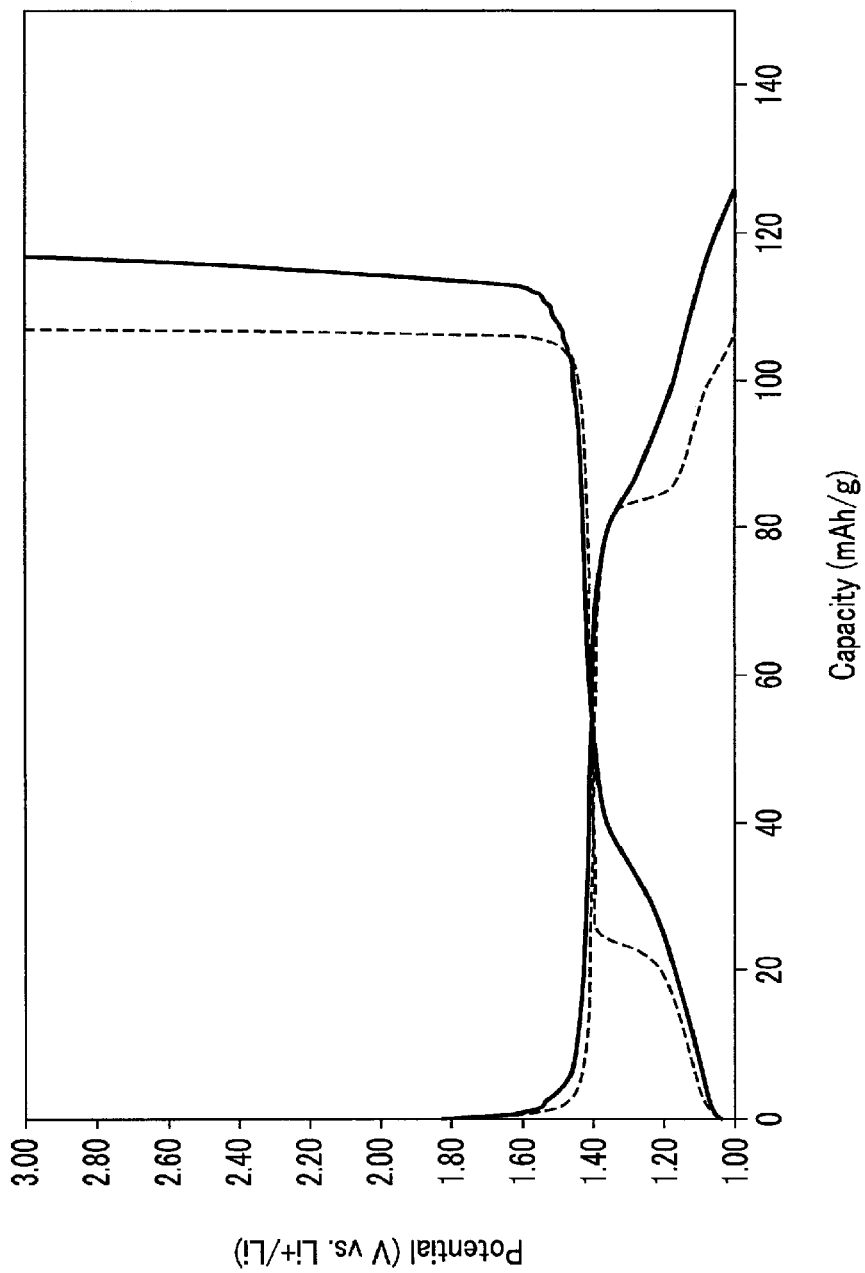
FIG. 1 shows a charge-and-discharge curve of a composite oxide $Li_2SrTi_6O_{14}$ and a charge-and-discharge curve of a composite oxide $Li_2(Sr_{0.75}Na_{0.25})Ti_{5.75}Nb_{0.25}O_{14}$.

In general, according to one embodiment, there is provided an active material. The active material contains a composite oxide having an orthorhombic crystal structure. The composite oxide is represented by a general formula of $Li_xM1_{1-y}M2_yTi_{6-z}M3_zO_{14+\delta}$. In the general formula, M1 is at least one selected from the group consisting of Sr, Ba, Ca, and Mg; M2 is at least one selected from the group consisting of Cs, K, and Na; M3 is at least one selected from the group consisting of Al, Fe, Zr, Sn, V, Nb, Ta, and Mo; and x is within a range of $2 \leq x \leq 6$, y is within a range of $0 < y < 1$, z is within a range of $0 < z \leq 6$, and $\delta$ is within a range of $-0.5 \leq \delta \leq 5$ 0.5.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

(First Embodiment)

According to a first embodiment, there is provided an active material for a battery. The active material contains a composite oxide having an orthorhombic crystal structure. The composite oxide is represented by a general formula of $Li_xM1_{1-y}M2_yTi_{6-z}M3_zO_{14+\delta}$. In the general formula, M1 is at least one selected from the group consisting of Sr, Ba, Ca, and Mg; M2 is at least one selected from the group consisting of Cs, K, and Na; M3 is at least one selected from the group consisting of Al, Fe, Zr, Sn, V, Nb, Ta, and Mo; and x is within a range of $2 \le x \le 6$, y is within a range of $0 < y < 1$, z is within a range of $0 < z \le 6$, and $\delta$ is within a range of $-0.5 \le \delta \le 0.5$.

The composite oxide contained in the active material for a battery according to the first embodiment is a substituted oxide in which a part of M1 sites is substituted by a metal cation M2, and at least a part of Ti sites is substituted by a metal cation M3 in a composite oxide having an orthorhombic crystal structure and represented by the general formula of $Li_xM1Ti_6O_{14+\delta}$.

The active material for a battery according to the first embodiment can have an average lithium-absorption-potential within the range of 0.5 V to 1.45 V (vs. Li/Li$^+$) to the redox potential of metallic lithium. Thereby, a nonaqueous electrolyte battery using the active material for a battery according to the first embodiment in a negative electrode can show a higher battery voltage than that of a nonaqueous electrolyte battery using a titanium composite oxide having a lithium-absorption-potential of 1.55 V (vs. Li/Li$^+$) as a negative electrode, for example.

The active material for a battery according to the first embodiment can show a smooth potential change in the potential range of 1.0 V to 1.45 V (vs. Li/Li$^+$). Hereinafter, the active material for a battery according to the first embodiment capable of showing a smooth potential change will be described with reference to FIG. 1.

FIG. 1 shows a charge-and-discharge curve (dashed line) of a composite oxide $Li_2SrTi_6O_{14}$, and a charge-discharge curve (solid line) of a composite oxide $Li_2(Sr_{0.75}Na_{0.25})Ti_{5.75}Nb_{0.25}O_{14}$. The composite oxide $Li_2(Sr_{0.75}Na_{0.25})Ti_{5.75}Nb_{0.25}O_{14}$ having a potential change shown by the solid line has an orthorhombic crystal structure, and can be contained in the active material for a battery according to the first embodiment. On the other hand, the composite oxide $Li_2SrTi_6O_{14}$ having a potential change shown by the dashed line is a composite oxide having an orthorhombic crystal structure and represented by the general formula of $Li_xM1Ti_6O_{14+\delta}$. The composite oxide $Li_2(Sr_{0.75}Na_{0.25})Ti_{5.75}Nb_{0.25}O_{14}$ is a composite oxide in which a part of Sr sites is substituted by Na and a part of Ti sites is substituted by Nb in the crystal structure of the composite oxide $Li_2SrTi_6O_{14}$.

As shown in FIG. 1, the charge-and-discharge curve of the composite oxide $Li_2SrTi_6O_{14}$ has a potential flat part in the potential range of about 1.4 V to 1.45 V (vs. Li/Li$^+$). However, when a potential becomes less than 1.4 V (vs. Li/Li$^+$), the potential steeply decreases. That is, the charge-and-discharge curve of the composite oxide $Li_2SrTi_6O_{14}$ includes a potential stepwise portion. The nonaqueous electrolyte battery produced by using the composite oxide showing such a potential change for the negative electrode causes a steep voltage change in low SOC, which makes it difficult to manage a voltage.

On the other hand, as shown in FIG. 1, the charge-and-discharge curve of the composite oxide $Li_2(Sr_{0.75}Na_{0.25})Ti_{5.75}Nb_{0.25}O_{14}$ can show a smooth potential change in the potential range of about 1.0 V to 1.45 V (vs. Li/Li$^+$). The nonaqueous electrolyte battery produced by using the composite oxide showing such a potential change for the negative electrode can suppress a steep voltage change in low SOC, which provides easy voltage management.

The composite oxide which can be contained in the active material for a battery according to the first embodiment can show a smooth potential change in the potential range of 1.0 V to 1.45 V (vs. Li/Li$^+$) because it can have uniform lithium-absorption sites. The reason for this will be described below.

The composite oxide which can be contained in the active material for a battery according to the first embodiment is represented by the general formula of $Li_xM1_{1-y}M2_yTi_{6-z}M3_zO_{14+\delta}$. In the composite oxide, Li exists as a monovalent cation. M1 is at least one divalent cation selected from the group consisting of Sr, Ba, Ca, and Mg. M2 is at least one monovalent cation selected from the group consisting of Cs, K, and Na. M3 is at least one selected from the group consisting of Al, Fe, Zr, Sn, V, Nb, Ta, and Mo. Here, each of Al and Fe is a trivalent cation. Each of Zr and Sn is a tetravalent cation. Each of V, Nb, and Ta is a pentavalent cation. Mo is a hexavalent cation. Here, the valence of each cation means the valence of each cation in a state where x is 2 in the above general formula, i.e., in a discharge state.

In the composite oxide, the total of the valences of cations coincides with the total valence of oxide ions which are anions, and charge neutrality is kept. Specifically, in the composite oxide, the total valences of lithium ions is x. The total of the valences of M1 is $2 \times (1-y)$. The total of the valences of M2 is y. The total of the valences of Ti is $4 \times (6-z)$. If 1 mol of the composite oxide contains $z_3$ mol of a trivalent cation M3, $z_4$ mol of a tetravalent cation M3, $z_5$ mol of a pentavalent cation M3, and $z_5$ mol of a hexavalent cation M3, the total of the valences of the M3 is the sum: $(z_3 \times 3)+(z_4 \times 4)+(z_5 \times 5)+(z_6 \times 6)$ (wherein, $z_3+z_4+z_5+z_6=z$). The total of the valences of these cations coincides with the total valence of oxide ions which are anions: $(-2) \times (14+\delta)$. Here, subscript $\delta$ of oxide ions can show a value within the range of $-0.5$ to $0.5$. Therefore, even if the total of the valences of the cations shown herein fluctuates within the range of $\pm 1$ to $-28$ valences which is the total valence of oxide ions, the same effect can be obtained. When $\delta$ deviates from the range of $-0.5 \le \delta \le 0.5$, the redox state of the each cations may deviate from a stable state or lattice defects such as oxygen defects may occur. In such case, the battery performance is decreased, which is not preferable.

Here, $\delta=0$ is set if each of the cations which constitute the composite oxide is in a stable oxidation state, and oxide ions exist in just proportion. In this occasion, the total valence of oxide ions is $-2 \times 14 = -28$. In this case, if the coincidence of the total of the valences of the cations with the total valence of oxide ions is represented using a formula, such formula (1) is:

$$x+\{2\times(1-y)\}+y+\{4\times(6-z)\}+\{(z_3\times3)+(z_4\times4)+(z_5\times5)+(z_6\times6)\}-28=0 \quad (1)$$

If the formula (1) is simplified, the following the formula (2) is set:

$$x-y-4z+(3z_3+4z_4+5z_5+6z_6)=2 \quad (2)$$

By satisfying the condition of the formula (2), the charge neutrality in the crystal structure of the composite oxide is kept. The composite oxide keeping the charge neutrality is a substituted oxide in which a part of M1 sites is correctly substituted by a metal cation M2, and at least a part of Ti sites is correctly substituted by a metal cation M3 in the crystal structure of the composite oxide represented by the general formula of $Li_xM1Ti_6O_{14+\delta}$. By containing the substituted oxide in which M2 and M3 are correctly substituted in the crystal structure of the composite oxide represented by the general formula of $Li_xM1Ti_6O_{14+\delta}$, the active material for a battery according to the first embodiment can make the coordination environment of oxide ions to void sites into which lithium ions are absorbed uniform. This is a reason why the composite oxide which can be contained in the active material for a battery according to the first embodiment can show a smooth potential change in the potential range of 1.0 V to 1.45 V (vs. $Li/Li^+$). On the other hand, when the uniformity of the coordination environment of the oxide ions to the void sites is low, the charge-and-discharge curve of the composite oxide shows a potential stepwise portion.

By containing the substituted oxide in which M2 and M3 are correctly substituted in the crystal structure of the composite oxide represented by the general formula of $Li_xM1Ti_6O_{14+\delta}$, the active material for a battery according to the first embodiment can provide a nonaqueous electrolyte battery which can exhibit a high reversible capacity during charge and discharge and excellent life performance.

Based on these results, the active material according to the first embodiment can realize a nonaqueous electrolyte battery which can exhibit a high energy density and a high battery voltage, has excellent life performance, and can provide easy voltage management.

Subscript x in the general formula of $Li_xM1_{1-y}M2_yTi_{6-z}M3_zO_{14+\delta}$ for the composite oxide may change within the range of $2 \leq x \leq 6$ according to the charging state of the composite oxide. For example, according to a production method to be described later, a composite oxide in which subscript x in the general formula is 2 can be produced, for example. When the composite oxide in which subscript x is 2 is included as a negative electrode active material in a nonaqueous electrolyte battery, and the nonaqueous electrolyte battery is charged, x is increased to a value within the range of more than 2 and 6 or less. Alternatively, by a method to be described later, for example, the composite oxide can also be synthesized in a raw material composition ratio set so that subscript x is within the range of more than 2 and 6 or less before an initial charge. The active material for a battery containing the composite oxide in a state where subscript x is within the range of more than 2 and 6 or less before initial charge can suppress the trapping of lithium ions in the structure during initial charge and discharge. As a result, an initial charge-and-discharge efficiency can be improved.

In an X-ray diffraction diagram obtained by a powder X-ray diffraction method using Cu—Kα rays, for the composite oxide represented by the general formula of $Li_xM1_{1-y}M2_yTi_{6-z}M3_zO_{14+\delta}$, an intensity ratio $I_L/I_H$ is preferably within the range of $0.6 \leq I_L/I_H \leq 3$. The intensity $I_L$ is an intensity of a strongest diffraction peak appearing within the range of $17° \leq 2\theta \leq 18.5°$. The intensity $I_H$ is an intensity of a strongest diffraction peak appearing within the range of $18.5° < 2\theta \leq 19.5°$.

The composite oxide as an example of such a preferred aspect has an orthorhombic crystal structure belonging to a space group Cmca, and in an X-ray diffraction diagram obtained by a powder X-ray diffraction method using Cu—Kα rays, an intensity ratio is within the range of $0.6 \leq I_{L1}/I_{H1} \leq 3$. The intensity $I_{L1}$ is an intensity of a diffraction peak having an intensity that is greater of the intensities of diffraction peaks corresponding to a (112) plane and a (021) plane. The intensity $I_{H1}$ is an intensity of a diffraction peak corresponding to a (220) plane.

Figure 2:
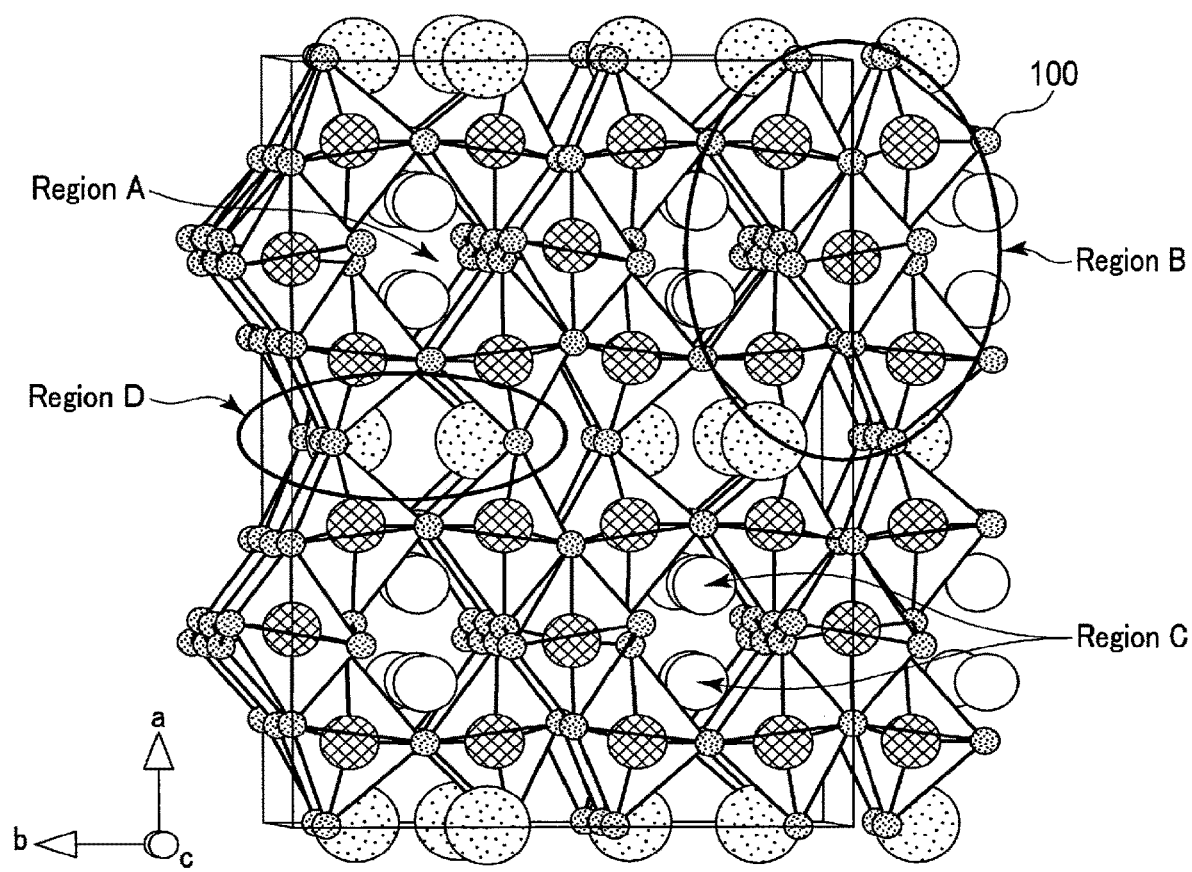
FIG. 2 is a crystal structure view of $Li_2(Sr_{0.75}Na_{0.25})Ti_{5.75}Nb_{0.25}O_{14}$ as an example of a composite oxide having symmetry of a space group Cmca.

FIG. 2 is a view of crystal structure of $Li_2(Sr_{0.75}Na_{0.25})Ti_{5.75}Nb_{0.25}O_{14}$ as an example of a composite oxide having symmetry of a space group Cmca.

In the crystal structure shown in FIG. 2, positions shown by smallest balls 100 in vertexes of the polyhedron show the positions of oxide ions.

In the crystal structure shown in FIG. 2, a region A shows a void site having a channel in which lithium ions can three-dimensionally move in the crystal structure, and the region A can absorb and release the lithium ions. A region B has a polyhedral structure of an oxide centering on Ti or Nb serving as the skeleton of the crystal structure. On the other hand, a region C is a site where lithium ions capable of being absorbed and released exist. A region D is site where Sr, Na, and Li which function as a skeleton for stabilizing a crystal structure exist.

In an X-ray diffraction diagram obtained by measuring the composite oxide as this example according to powder X-ray diffraction using Cu—Kα rays, an intensity ratio $I_{L1}/I_{H1}$ is within the range of $0.6 \leq I_{L1}/I_{H1} \leq 3$. The intensity $I_{L1}$ is an intensity of a diffraction peak having an intensity that is greater of the intensities of a diffraction peak appearing within the range of $17.8° \leq 2\theta \leq 18.5°$ and corresponding to a (112) plane and a diffraction peak appearing within the range of $17.0° \leq 2\theta < 17.8°$ and corresponding to a (021) plane. The intensity $I_{H1}$ is an intensity of a diffraction peak appearing within the range of $18.5° < 2\theta < 19.5°$ and corresponding to a (220) plane.

The composite oxide of this example can have crystallites grown in a preferable direction for absorbing and releasing lithium ions. Furthermore, the composite oxide of this example can also suppress the absorption of lithium ions into void sites the oxide-ions coordination environments of which are different to each other. Such an absorption of lithium ions is a cause of a charge-and-discharge curve having a stepwise portion. Thereby, the active material for a battery containing the composite oxide of this example not only exhibits a smooth charge-and-discharge curve and but also improves the reversibility of the lithium ions during charge and discharge. Therefore, the effective capacity can be increased and the life performance of the nonaqueous electrolyte battery can be improved, which is preferable.

A composite oxide of another example of a preferable aspect in which an intensity ratio $I_L/I_H$ is within the range of $0.6 \leq I_L/I_H \leq 3$ in an X-ray diffraction diagram for the composite oxide obtained by a powder X-ray diffraction method has an orthorhombic crystal structure belonging to a space group Fmmm, and in the X-ray diffraction diagram obtained by the powder X-ray diffraction method using Cu—Kα rays, an intensity ratio $I_{L2}/I_{H2}$ is within a range of $0.6 \leq I_{L2}/I_{H2} \leq 3$. The intensity $I_{L2}$ is an intensity of a diffraction peak corresponding to a (111) plane. The intensity $I_{H2}$ is an intensity of a diffraction peak corresponding to a (202) plane.

FIG. 3 is a view of a crystal structure of $Li_2(Sr_{0.25}Na_{0.75})Ti_{5.25}Nb_{0.75}O_{14}$ as an example of a composite oxide having symmetry of a space group Fmmm.

In the crystal structure shown in FIG. 3, the smallest balls 100 show the positions of oxide ions.

In the crystal structure shown in FIG. 3, a region A shows a void site having a channel in which lithium ions can three-dimensionally move in the crystal structure, and the region A can absorb and release the lithium ions. A region B has a polyhedral structure of an oxide centering on Ti or Nb serving as the skeleton of the crystal structure. On the other hand, a region C is a site where lithium ions capable of being absorbed and released exist. A region D is a site where Sr, Na, and Li which function as a skeleton for stabilizing a crystal structure exist.

In an X-ray diffraction diagram obtained by measuring the composite oxide as this example according to powder X-ray diffraction using Cu—Kα rays, an intensity ratio $I_{L2}/I_{H2}$ is within the range of $0.6 \leq I_{L2}/I_{H2} \leq 3$. The intensity $i_{L2}$ is an intensity of a diffraction peak appearing within the range of $17.8° \leq 2\theta \leq 18.5°$ and corresponding to a (111) plane. The intensity $I_{H2}$ is an intensity of a diffraction peak appearing within the range of $18.5° < 2\theta < 19.5°$ and corresponding to a (202) plane.

The composite oxide of this example can have crystallites grown in a preferable direction for absorbing and releasing lithium ions. Furthermore, the composite oxide of this example can suppress the absorption of lithium ions into void sites the oxide-ions coordination environments of which are different to each other. Such an adsorption of lithium ions is a cause of a charge-and-discharge curve having a stepwise portion. Thereby, the active material for a battery containing the composite oxide of this example not only exhibits a smooth charge-and-discharge curve and but also improves the reversibility of the lithium ions during charge and discharge. Therefore, the effective capacity can be increased and the life performance of the nonaqueous electrolyte battery can be improved, which is preferable.

Even if the active material for a battery according to the first embodiment contains a composite oxide having a crystal structure in which crystal phases having symmetries of Cmca and Fmmm are mixed, or contains a composite oxide having a crystal structure similar to symmetry of Cmca or Fmmm, the active material for a battery can provide the same effect as that of an active material for a battery containing a composite oxide having symmetry of a space group Cmca or a composite oxide having symmetry of a space group Fmmm. Specific examples of symmetry similar to that of Cmca or Fmmm include Pmcm, Pmma, and Cmma. In the composite oxide having a crystal structure having each of such symmetries, regardless of a crystal plane index, an intensity ratio $I_L/I_H$ is preferably within a range of $0.6 \leq I_L/I_H \leq 3$, wherein the intensity $I_L$ is an intensity of a strongest diffraction peak appearing within the range of $17.0° \leq 2\theta \leq 18.5°$ and the intensity $I_H$ is an intensity of a strongest diffraction peak appearing within the range of $18.5° < 2\theta \leq 19.5°$. This not only provides a smooth charge-and-discharge curve and but also improves the reversibility of the lithium ions during charge and discharge. Therefore, the effective capacity can be increased and the life performance of the nonaqueous electrolyte battery can be also improved.

In the general formula of $Li_xM1_{1-y}M2_yTi_{6-z}M3_zO_{14+\delta}$, subscript x varies within the range of $2 \leq x \leq 6$ depending on the charging state of a composite oxide represented by the general formula. Subscript y shows a percentage of cation M1 sites substituted by cations M2 in the crystal structure of the composite oxide represented by the general formula of $Li_xM1_1Ti_6O_{14+\delta}$. Subscript y is within the range of $0 < y < 1$, preferably within the range of $0.1 \leq y \leq 0.9$, and more preferably within the range of $0.25 \leq y \leq 0.75$. Subscript z shows a percentage of Ti sites substituted by cations M3 in the crystal structure of the composite oxide represented by the general formula of $Li_xM1_1Ti_6O_{14+\delta}$. Subscript z is within the range of $0 < z \leq 6$, preferably within the range of $0.1 \leq z \leq 0.9$, and more preferably within the range of $0.25 \leq z \leq 0.75$.

In the general formula of $Li_xM1_{1-y}M2_yTi_{6-z}M3_zO_{14+\delta}$, subscript $\delta$ can vary within the range of $-0.5 \leq \delta \leq 0.5$ due to oxygen defects of the composite oxide represented by the general formula and the amount of oxygen inevitably mixed during a producing process of the active material for a battery.

Although each of subscript x, y, z, and $\delta$ may be within a specific numerical value range as described above, the total valences of cations and the total valences of anions are equal to each other in the composite oxide represented by the general formula of $Li_xM1_{1-y}M2_yTi_{6-z}M3_zO_{14+\delta}$, as previously described.

In one preferable aspect, the composite oxide contained in the active material for a battery according to the first embodiment is represented by the general formula of $Li_xSr_{1-y}Na_yTi_{6-z}M3_zO_{14+\delta}$. In the formula, M3 is at least one selected from the group consisting of Al, Fe, Zr, Sn, V, Nb, Ta, and Mo; x is within the range of $2 \leq x \leq 6$; y is within the range of $0 < y < 1$; z is within the range of $0 < z \leq 6$; and $\delta$ is within the range of $-0.5 \leq \delta \leq 0.5$.

By substituting a part of sites of Sr by Na having an ion radius close to that of Sr ion in the orthorhombic crystal structure of a composite oxide represented by the formula $Li_xSrTi_6O_{14}$, lithium absorption potential can be lowered without largely changing the lattice constant of the crystal. Thereby, the energy density per unit weight or unit volume can be increased while a lattice volume which easily absorbs and releases lithium ions is kept.

Furthermore, in a more preferable aspect, the cation M3 is Nb. That is, in the more preferable aspect, the composite oxide contained in the active material for a battery according to the first embodiment is represented by the general formula of $Li_xSr_{1-y}Na_yTi_{6-z}Nb_zO_{14+\delta}$. Since Nb can be subjected to divalent reduction from a pentavalent state to a trivalent state, the amount of lithium absorption of the composite oxide can be increased by substituting at least a part of Ti which can be subjected to univalent reduction from a tetravalent state to a trivalent state by Nb. Furthermore, Nb exhibits a smooth change in potential based on the redox potential of metallic lithium in a wide potential range of 1.5 V to 1.0 V to the redox potential of metallic lithium when the composite oxide absorbs Li. Therefore, by substituting at least a part of Ti by Nb, not only the charge-and-discharge capacity is increased, but also the potential flat part is made smoother sloping as previously described with reference to FIG. I, which provides easy correlation between charge-and-discharge potential and a charging state, and easy charge management of the battery.

The composite oxide contained in the active material for a battery according to the first embodiment may be in a particle form, for example. The average particle size of the composite oxide contained in the active material for a battery according to the first embodiment is not particularly limited, and can be changed according to desired battery characteristics.

The active material for a battery according to the first embodiment preferably contains the above composite oxide particles and a conductive substance such as carbon with which the surface of particles is covered. The active material for a battery of such a preferable aspect can show improved rapid charge-discharge performance. Since the absorption and release of lithium may occur via a homogeneous solid state reaction in the composite oxide, the composite oxide has a property that electrical conductivity is increased according as the absorbed amount of lithium increases. In the composite oxide, a region where the amount of lithium absorbed is low has relatively low electrical conductivity. Therefore, an excellent rapid-charge-and-discharge performance can be obtained, regardless of the absorbed amount of lithium, by previously covering the surface of composite oxide particles with a conductive substance such as carbon.

Alternatively, by covering the surface of the composite oxide particles with lithium titanate, which exhibit electrical conductivity by absorbing lithium, in place of the conductive substance such as carbon, the same effect can be obtained. In addition, since lithium titanate with which the surface of the composite oxide particles is covered exhibit an insulation property by the release of lithium when the battery is internally short-circuited, the lithium titanate can exhibit excellent safety.

<BET Specific Surface Area>

The BET specific surface area of the composite oxide contained in the active material for a battery according to the first embodiment is not particularly limited, and is preferably 5 m²/g or more and less than 200 m²/g. The BET specific surface area is more preferably 5 to 30 m²/g.

When the BET specific surface area is 5 m²/g or more, the contact area with the electrolytic solution can be secured. Thus, good discharge rate performances can be easily obtained and also, a charge time can be shortened. On the other hand, when the BET specific surface area is less than 200 m²/g, reactivity with the electrolytic solution can be prevented from being too high and therefore, the life performance can be improved. When the BET specific surface area is 30 m²/g or less, side reactions with the electrolytic solution can be suppressed, and thereby longer life can be further expected. And, in this case, a coatability of a slurry containing the active material for a battery in the production of an electrode, which will be described later, can be improved.

Here, as the measurement of the specific surface area, a method is used, the method including allowing molecules of which an occupied area in adsorption is known to be adsorbed onto the surface of powder particles at the temperature of liquid nitrogen and determining the specific surface area of the sample from the amount of adsorbed molecules. The most frequently used method is a BET method based on the low temperature/low humidity physical adsorption of an inert gas. This method is based on the best-known theory of the method of calculating the specific surface area in which the Langmuir theory as a monolayer adsorption theory is extended to multilayer adsorption. The specific surface area determined by the above method is referred to as "BET specific surface area".

<Production Method>

The active material for a battery according to the first embodiment can be synthesized by a solid reaction method which will be described below. First, raw materials such as an oxide, a compound and a salt are mixed in a suitable stoichiometric ratio to obtain a mixture. The above salt is preferably a salt such as a carbonate or nitrate, which is decomposed at a relatively low temperature to form an oxide. Next, the obtained mixture is ground and mixed as uniformly as possible. Next, the mixture is calcinated. The calcination is performed in a temperature range from 600 to 850° C. in the atmosphere for a total of 1 to 3 hours. Next, a firing temperature is increased, and main sintering is performed in a range from 900 to 1500° C. in the atmosphere. At this time, when lithium which is a light element is fired at a temperature of 900° C. or more, it may vaporize. In this case, the vaporized amount of lithium under the firing conditions is examined, and a vaporized amount is compensated for by providing a raw material containing lithium in an excess amount to obtain a sample having an appropriate composition. Furthermore, it is more preferable to prevent lattice defects due to oxygen defects or the like. For example, by, before the main sintering, subjecting the raw material powder to pressure forming into a pellet or rod shape, the area of the raw material powder brought into contact with the atmosphere is decreased and the contact surface between particles is increased, and in this state sintering is performed, thereby the formation of the lattice defects can be suppressed. In the case of industrial mass production, a raw material powder is preferably sintered under a high oxygen partial pressure such as under an oxygen atmosphere, or heat-treated (annealed) in a temperature range of 400 to 1000° C. after usual sintering in the atmosphere to restore oxygen defects. Crystallinity may be decreased if the formation of lattice defects is not suppressed by such a manner.

When the composite oxide obtained by synthesizing as described above has symmetry belonging to a space group Cmca, an intensity ratio $I_{L1}/I_{H1}$ is $0.6 \leq I_{L1}/I_{H1} \leq 3$ in an X-ray diffraction diagram obtained by a powder X-ray diffraction method using Cu—Kα rays. The intensity $I_{Li}$ is an intensity of a diffraction peak having an intensity that is greater of the intensities of a diffraction peak appearing in the range of $17.8° \leq 2\theta \leq 18.5°$ and corresponding to a (112) plane or a diffraction peak appearing in the range of $17.0° \leq 2\theta \leq 17.8°$ and corresponding to a (021) plane in the X-ray diffraction diagram. The intensity $I_{H1}$ is an intensity of a diffraction peak appearing in the range of $18.5° < 2\theta \leq 19.5°$ and corresponding to a (220) plane in the X-ray diffraction diagram. When the composite oxide obtained by synthesizing as described above has symmetry belonging to a space group Fmmm, an intensity ratio $I_{L2}/I_{H2}$ is $0.6 \leq I_{L2}/I_{H2} \leq 3$ in an X-ray diffraction diagram obtained by a powder X-ray diffraction method using Cu—Kα rays. The intensity $I_{L2}$ is an intensity of a diffraction peak appearing in the range of $17.8° \leq 2\theta \leq 18.5°$ and corresponding to a (111) plane in the X-ray diffraction diagram. The intensity $I_{H2}$ is an intensity of a diffraction peak appearing in the range of $18.5° < 2\theta \leq 19.5°$ and corresponding to a (202) plane in the X-ray diffraction diagram.

As previously described, a composite oxide in which subscript x in the general formula is 2 can be produced by the synthesis as described above. When the composite oxide in which subscript x is 2 is included as a negative electrode active material in a nonaqueous electrolyte battery, and the nonaqueous electrolyte battery is charged, x is increased to a value within the range of more than 2 and 6 or less. Alternatively, a composite oxide in which x is within the range of more than 2 and 6 or less can also be synthesized by synthesizing a composite oxide in a raw material composition ratio in which x is within the range of more than 2 and 6 or less using a lithium source such as lithium carbonate as a raw material. A composite oxide in which x is within the range of more than 2 and 6 or less can also be obtained by synthesizing a composite oxide, and thereafter immersing the composite oxide into a lithium hydroxide aqueous solution or the like.

Next, a method for obtaining an X-ray diffraction diagram of a composite oxide according to a powder X-ray diffraction method, and a method for confirming the composition of the composite oxide will be described.

When an active material to be measured is contained in an electrode material of a nonaqueous electrolyte battery, preprocessing is performed in the following manner.

First, the active material is put into a state close to a state in which lithium ions are perfectly released from the crystal of the active material. When the active material to be measured is contained in a negative electrode, the battery is put into a fully discharged state. However, there is the case where lithium ions remain unremoved even in a discharged state. However, the lithium ions do not significantly influence powder X-ray diffraction measurement results to be described later.

Next, the battery is disassembled in a glove box filled with argon, and an electrode is taken out. The taken-out electrode is washed with an appropriate solvent, and dried under reduced pressure. For example, ethyl methyl carbonate or the like can be used. After washing and drying, no white deposit such as a lithium salt is confirmed to be present on the surface.

When the electrode is subjected to powder X-ray diffraction measurement, the washed electrode is cut into a size having the same area as the holder of the powder X-ray diffractometer, for use as a measurement sample.

When the washed electrode is subjected to composition analysis, the active material is taken out from the electrode, and the taken-out active material is analyzed, which will be described later.

<Method for Obtaining X-Ray Diffraction Diagram of Composite Oxide according to Powder X-Ray Diffraction Method>

The powder X-ray diffraction measurement of the active material is performed in the following manner.

First, a target sample is ground until the average particle size reaches about 5 μm. Even when the average particle size is originally less than 5 μm, the aggregate is preferably subjected to a grinding treatment in a mortar or the like in order to grind the aggregate. The average particle size can be found by the laser diffraction method. The ground sample is filled in a holder part which is formed on a glass sample plate and has a depth of 0.5 mm. A glass sample plate manufactured by Rigaku is used as the glass sample plate. At this time, much care is necessary to fill the holder part fully with the sample. Special care should be taken to avoid cracking and formation of voids caused by insufficient filling of the sample. Then, another glass plate is used to smooth the surface of the sample by sufficiently pressing the glass plate against the sample. In this case, much care should be taken to avoid too much or too little amount of the sample to be filled, so as to prevent any rises and dents in the basic plane of the glass holder. Then, the glass plate filled with the sample is set in a powder x-ray diffractometer. And then, a diffraction pattern [XRD (X-ray diffraction) pattern] is obtained by using Cu—Kα rays.

In the case where an orientation in which crystal planes are arranged in a specific direction according to the shapes of particles is observed from the results of the Rietveld analysis, there is the possibility of deviation of peak position and variation in an intensity ratio, depending on the way of filling the sample when the glass plate is filled with the sample. Such a sample having high orientation is measured using a capillary (cylindrical glass narrow tube). Specifically, the sample is inserted into the capillary, which is then mounted on a rotary sample table to measure while being rotated. Such a measuring method can provide the result of reducing the influence of orientation.

As an apparatus for powder X-ray diffraction measurement, SmartLab manufactured by Rigaku is used. Measurement is performed under the following condition: Cu target; 45 kV, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: $5° \leq 2\theta \leq 90°$. When another apparatus is used, measurement using a standard Si powder for powder X-ray diffraction is performed under conditions where a peak intensity and a peak top position correspond to those by obtained using the above apparatus so as to obtain measurement results equivalent to those described above.

The X-ray diffraction (XRD) pattern obtained herein must be applicable to Rietveld analysis. In order to collect the data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The parameters of the crystal structure (lattice constant, atomic coordinate, and occupancy or the like) can be precisely analyzed by fitting all the calculated values and measurement values. Thereby, the characteristics of the crystal structure of the synthesized composite oxide can be determined. The occupancies of constitutional elements in each of the sites can be determined. A fitting parameter S is used as the scale for estimating the degree of agreement between the measured intensity and the calculated intensity in the Rietveld analysis. The S value must be less than 1.8 in the analysis. When determining the occupancies in each of the sites, the standard deviation $\sigma_j$ must be taken into consideration. The fitting parameter S and standard deviation $\sigma_j$ defined herein are estimated using the formula described in "Funmatsu X sen Kaisetsu no Jissai (Reality of Powder X-Ray Analysis)", X-Ray Analysis Investigation Conversazione, The Japan Society for Analytical Chemistry, written and edited by Izumi Nakai and Fujio Izumi (Asakura Publishing Co., Ltd.).

By the above method, information about the crystal structure of the active material to be measured can be obtained. For example, when the active material according to the first embodiment is measured as described above, the active material to be measured is found to have a composite oxide having an orthorhombic structure. The symmetry of the crystal structure to be measured such as space groups Cmca or Fmmm can be examined, for example, by measuring as described above.

On the other hand, in order to determine the previously described intensities $I_L$ and $I_H$ of diffraction peaks for the composite oxide ($I_{L1}$ and $I_{H1}$ or $I_{L2}$ and $I_{H2}$), the powder X-ray diffraction results measured under the above conditions without processing, i.e., raw data is used. The peak top, i.e., the maximum intensity of a strongest diffraction peak appearing within the range of $17.0° \leq 2\theta \leq 18.5°$ is defined as $I_L$. On the other hand, the peak top, i.e., the maximum intensity of a strongest diffraction peak appearing within the range of $18.5° < 2\theta \leq 19.5°$ is defined as $I_H$. An intensity ratio $I_L/I_H$ can be calculated by dividing the intensity numerical value (counts per second: cps) of the intensity $I_L$ by the intensity numerical value (cps) of the intensity $I_H$.

When the active material to be measured is contained in the electrode material of the nonaqueous electrolyte battery, first, the electrode is taken out from the nonaqueous electrolyte battery according to the previously described procedure. The taken-out and washed electrode is cut to the size almost equal to the area of the holder of a powder X-ray diffractometer, and used as the measurement sample.

The obtained measurement sample is affixed directly to the glass holder, and measured. In this case, the position of the peak originated from the electrode substrate such as a metal foil is previously measured. The peaks of other components such as a conductive agent and a binder are also previously measured. When the peaks of the substrate and active material overlap to each other, it is desirable that the layer containing the active material (e.g., the below-described active material layer) is separated from the substrate, and subjected to measurement. This is a process for separating the overlapping peaks when the peak intensity is quantitatively measured. For example, the active material layer can be separated by irradiating the electrode substrate with an ultrasonic wave in a solvent. The active material layer is inserted into the capillary, mounted on the rotary sample table, and measured. As a result of this process, the XRD pattern of the active material can be obtained with the influence of the orientation reduced.

<Method for Confirming Composition of Composite Oxide>

The composition of the active material for a battery can be analyzed using Inductively Coupled Plasma (ICP) emission spectrography, for example. In this case, the abundance ratios of elements depend on the sensitivity of an analyzing device to be used. Therefore, when the composition of the active material for a battery as an example according to the first embodiment is analyzed, for example, using ICP emission spectrography, the numerical values may deviate due to errors of the measuring device from the previously described element ratios. However, even if the measurement results deviate as described above in the error range of the analyzing device, the active material for a battery as an example according to the first embodiment can sufficiently exhibit the previously described effects.

In order to measure the composition of the active material for a battery included in the battery according to ICP emission spectrography, the following procedure is specifically performed. First, according to the previously described procedure, an electrode containing an active material to be measured is taken out from a nonaqueous electrolyte battery, and washed. The washed electrode is put in a suitable solvent, and irradiated with an ultrasonic wave. For example, an electrode is put into ethyl methyl carbonate in a glass beaker and the glass beaker is vibrated in an ultrasonic washing machine, and thereby an electrode layer containing an electrode active material can be separated from a current collector. Next, the separated electrode layer is dried under reduced pressure. The obtained electrode layer is ground in a mortar or the like to provide a powder containing the target active material for a battery, conductive auxiliary agent, and binder or the like. By dissolving the powder in an acid, a liquid sample containing the active material for a battery can be prepared. At this time, hydrochloric acid, nitric acid, sulfuric acid, and hydrogen fluoride or the like can be used as the acid. The composition of the active material for a battery can be found by subjecting the liquid sample to ICP emission spectrochemical analysis.

According to the first embodiment, there is provided an active material for a battery containing a composite oxide having an orthorhombic crystal structure. The composite oxide is represented by a general formula of $Li_xM1_{1-y}M2_yTi_{6-z}M3_zO_{14+\delta}$. The composite oxide can show a smooth potential change in the potential range of 1.0 V to 1.45 V (vs. Li/Li$^+$). As a result, the active material for a battery according to the first embodiment can realize a nonaqueous electrolyte battery which can exhibit a high energy density and a high battery voltage, has excellent life performance and provides easy voltage management.

(Second Embodiment)

According to a second embodiment, a nonaqueous electrolyte battery is provided. The nonaqueous electrolyte battery includes a negative electrode containing the active material for a battery according to the first embodiment, a positive electrode, and a nonaqueous electrolyte.

The nonaqueous electrolyte battery according to the second embodiment can further include a separator provided between the positive electrode and the negative electrode. The positive electrode, the negative electrode, and the separator can constitute an electrode group. The nonaqueous electrolyte may be held in the electrode group.

The nonaqueous electrolyte battery according to the second embodiment can further include an exterior member accommodating the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may be extended to the outside of the exterior member.

Hereinafter, the negative electrode, the positive electrode, the nonaqueous electrolyte, the separator, the exterior member, the positive electrode terminal, and the negative electrode terminal will be described in detail.

1) Negative Electrode

The negative electrode can include a current collector and a negative electrode layer (negative electrode active material-containing layer). The negative electrode layer may be formed on one or both surfaces of the current collector. The negative electrode layer can contain a negative electrode active material, and optionally a conductive agent and a binder.

The active material for a battery according to the first embodiment can be contained as the negative electrode active material in the negative electrode layer. The negative electrode using the active material for a battery according to the first embodiment can have a low electrode potential in which a potential smoothly changes in the range of 1.4 V (vs. Li/Li$^+$) to 1.0 V (vs. Li/Li$^+$). Therefore, the nonaqueous electrolyte battery according to the second embodiment including such a negative electrode can provide easy charge-and-discharge management, and exhibit excellent life performance, a high energy density, and a high battery voltage.

In the negative electrode, the active material for a battery according to the first embodiment may be singly used as the negative electrode active material, but a mixture prepared by mixing the active material for a battery according to the first embodiment with another active material may also be used. Examples of other active materials include lithium titanate having a ramsdellite structure (e.g., $Li_2Ti_3O_7$), lithium titanate having a spinel structure (e.g., $Li_4Ti_5O_{12}$), monoclinic type titanium dioxide ($TiO_2$ (B)), anatase type titanium dioxide, rutile type titanium dioxide, a hollandite-type titanium composite oxide, and a monoclinic type niobium titanium composite oxide (e.g., $Nb_2TiO_7$).

The conductive agent is added to improve a current collection performance and to suppress the contact resistance between the negative electrode active material and the current collector. Examples of the conductive agent include carbonaceous substances such as vapor grown carbon fiber (VGCF), acetylene black, carbon black, and graphite.

The binder is added to fill gaps in the dispersed negative electrode active material and also to bind the negative electrode active material with the current collector. Examples of the binder include polytetrafluoroethylene (PTFE), polyvinylidene fluoride (PVdF), fluorine rubber, styrene-butadiene rubber, a polyacrylic acid compound, and an imide compound.

The blending ratios of the active material, conductive agent and binder in the negative electrode layer are preferably 68% by mass to 96% by mass, 2% by mass to 30% by mass, and 2% by mass to 30% by mass, respectively. When the content of the conductive agent is 2% by mass or more, the current collection performance of the negative electrode layer can be improved. When the content of the binder is 2% by mass or more, binding between the negative electrode layer and current collector is sufficiently achieved, and excellent cycling characteristics can be expected. On the other hand, each of the contents of the conductive agent and binder is preferably 28% by mass or less, thereby increasing the capacity.

As the current collector, a material which is electrochemically stable at the lithium absorption and release potential of the negative electrode active material is used. The current collector is preferably made of copper, nickel, stainless steel or aluminum, or an aluminum alloy containing one or more elements selected from Mg, Ti, Zn, Mn, Fe, Cu, and Si. The thickness of the current collector is preferably 5 to 20 μm. The current collector having such a thickness can keep a balance between the strength and weight reduction of the negative electrode.

By using the active material for a battery according to the first embodiment, the density of the negative electrode layer (excluding the current collector) can be set to the range of 1.8 g/cm³ to 2.8 g/cm³. The negative electrode in which the density of the negative electrode layer is within the range can exhibit an excellent energy density and excellent electrolytic solution holdablility. More preferably, the density of the negative electrode layer is 2.1 g/cm³ to 2.6 g/cm³.

The negative electrode is produced by, for example, suspending a negative electrode active material, a binder, and a conductive agent in an ordinary solvent to prepare a slurry, applying the slurry to a current collector, drying the coating to form a negative electrode layer, and then pressing the layer. Alternatively, the negative electrode may be also produced by forming a negative electrode active material, a binder, and a conductive agent into pellets to produce a negative electrode layer, and placing it on a current collector.

2) Positive Electrode

The positive electrode can include a current collector and a positive electrode layer (positive electrode active material-containing layer). The positive electrode layer may be formed on one or both surfaces of the current collector. The positive electrode layer can include a positive electrode active material, and optionally a conductive agent and a binder.

The positive electrode active material may be, for example, an oxide or sulfide. Examples of the oxide and sulfide include a compound capable of absorbing and releasing lithium. Specific examples thereof include manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium manganese nickel composite oxide having a spinel structure (e.g., $Li_xMn_{2-y}Ni_yO_4$), lithium phosphorus oxide having an olivine structure (e.g., $Li_xFePO_4$, $Li_xFe_{1-y}Mn_yPO_4$, and $Li_xCoPO_4$), iron sulfate [$Fe_2(SO_4)_3$], vanadium oxide (e.g., $V_2O_5$), and lithium nickel cobalt manganese composite oxide. In the above-described formula, $0<x\leq1$, and $0<y\leq1$. As the active material, one of these compounds may be used singly, or combination of two or more of the compounds can be used.

More preferred examples of the positive electrode active material include lithium manganese composite oxide having a high positive electrode voltage (e.g., $Li_xMn_2O_4$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese nickel composite oxide having a spinel structure (e.g., $Li_xMn_{2-y}Ni_yO_4$), lithium manganese cobalt composite oxide (e.g., $Li_xMn_yCo_{1-y}O_2$), lithium iron phosphate (e.g., $Li_xFePO_4$), and lithium nickel cobalt manganese composite oxide. In the above-described formula, $0<x\leq1$, and $0<y\leq1$.

When an ordinary-temperature molten salt is used as the nonaqueous electrolyte of the battery, preferred examples of the positive electrode active material include lithium iron phosphate, $Li_xVPO_4F$ ($0\leq x\leq1$), lithium manganese composite oxide, lithium nickel composite oxide, and lithium nickel cobalt composite oxide. Since these compounds have low reactivity with ordinary-temperature molten salts, they can improve the cycle life.

The primary particle size of the positive electrode active material is preferably 100 nm to 1 μm. The positive electrode active material having a primary particle size of 100 nm or more is easy to handle during industrial production. The positive electrode active material having a primary particle size of 1 μm or less can allow lithium ions to smoothly diffuse in solids.

The specific surface area of the positive electrode active material is preferably 0.1 m²/g to 10 m²/g. The positive electrode active material having a specific surface area of 0.1 m²/g or more can secure sufficient sites in which lithium ions can be absorbed and released. The positive electrode active material having a specific surface area of 10 m²/g or less is easy to handle during industrial production, and can secure a good charge-and-discharge cycle performance.

The binder is added to bind the positive electrode active material with the current collector. Examples of the binder include polytetrafluoroethylene (PTFE), polyvinylidene fluoride (PVdF), fluorine rubber, a polyacrylic acid compound, and an imide compound.

The conductive agent is as necessary added to improve the current collection performance, and to suppress the contact resistance between the positive electrode active material and current collector. Examples of the conductive agent include carbonaceous substances such as acetylene black, carbon black and graphite.

In the positive electrode layer, the blending ratios of the positive electrode active material and binder are preferably 80% by mass to 98% by mass, and 2% by mass to 20% by mass, respectively.

When the binder content is 2% by mass or more, sufficient electrode strength can be achieved. When the binder content is 20% by mass or less, the loading of the insulator in the electrode can be reduced, and thereby the internal resistance can be decreased.

When a conductive agent is added, the blending ratios of the positive electrode active material, binder, and conductive agent are preferably 77% by mass to 95% by mass, 2% by mass to 20% by mass, and 3% by mass to 15% by mass, respectively. When the content of the conductive agent is 3% by mass or more, the above-described effects can be achieved. By setting the amount of the positive electrode conductive agent to 15% by mass or less, the decomposition of a nonaqueous electrolyte on the surface of the positive electrode conductive agent in high-temperature storage can be reduced.

The current collector is preferably an aluminum foil, or an aluminum alloy foil containing one or more elements selected from Mg, Ti, Zn, Ni, Cr, Mn, Fe, Cu, and Si.

The thickness of the aluminum foil or aluminum alloy foil is preferably 5 μm to 20 μm, and more preferably 15 μm or less. The purity of the aluminum foil is preferably 99% by mass or more. The content of the transition metal such as iron, copper, nickel, or chromium contained in the aluminum foil or aluminum alloy foil is preferably 1% by mass or less.

The positive electrode is produced by, for example, suspending a positive electrode active material, a binder, and as necessary a conductive agent in an appropriate solvent to prepare a slurry, applying the slurry to a positive electrode current collector, drying the coating to form a positive electrode layer, and then pressing the layer. Alternatively, the positive electrode may be also produced by forming an active material, a binder, and as necessary a conductive agent into pellets to produce a positive electrode layer, and placing it on a current collector.

3) Nonaqueous Electrolyte

The nonaqueous electrolyte may be, for example, a liquid nonaqueous electrolyte which is prepared by dissolving an electrolyte in an organic solvent, or gel-like nonaqueous electrolyte which is a composite of a liquid electrolyte and a polymer material.

The liquid nonaqueous electrolyte is preferably prepared by dissolving an electrolyte in an organic solvent in the concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE); γ-butyrolactone (GBL), acetonitrile (AN), and sulfolane (SL). One of these organic solvents can be used alone or a mixed solvent can be used.

Examples of the polymeric material include polyvinylidene fluoride (PVdF), polyacrylonitrile (PAN), and polyethylene oxide (PEO).

Alternatively, the nonaqueous electrolyte may be, for example, an ordinary-temperature molten salt (ionic melt) containing lithium ions, a polymer solid electrolyte, or an inorganic solid electrolyte.

The ordinary-temperature molten salt (ionic melt) means compounds which can exist in a liquid state at ordinary temperature (15 to 25° C.) among organic salts constituted of combinations of organic cations and anions. The ordinary-temperature molten salt includes an ordinary-temperature molten salt which exists alone as a liquid, an ordinary-temperature molten salt which becomes a liquid after being mixed with an electrolyte, and an ordinary-temperature molten salt which becomes a liquid after being dissolved in an organic solvent. In general, the melting point of the ordinary-temperature molten salt used in nonaqueous electrolyte batteries is 25° C. or below. The organic cations generally have a quaternary ammonium skeleton.

The polymer solid electrolyte is prepared by dissolving the electrolyte in a polymeric material, and solidifying it.

The inorganic solid electrolyte is a solid substance having lithium ion conductivity.

4) Separator

The separator may be made of, for example, a porous film or synthetic resin nonwoven fabric containing polyethylene, polypropylene, cellulose, or polyvinylidene fluoride (PVdF). Among these, a porous film containing polyethylene or polypropylene can improve safety because the porous film melts at a fixed temperature to be able to shut off a current.

5) Exterior Member

The exterior member may be, for example, a laminate film having a thickness of 0.5 mm or less, or a metal case having a thickness of 1 mm or less. The thickness of the laminate film is more preferably 0.2 mm or less. The thickness of the metal case is more preferably 0.5 mm or less, and still more preferably 0.2 mm or less.

The shape of the exterior member is not particularly limited, and may be, for example, flat (thin), square, cylinder, coin, or button-shaped. The exterior member depends on the size of the battery, and may be that for a compact battery mounted on mobile electronic devices, and a large battery mounted on two- to four-wheel automobiles.

The laminate film used herein is a multilayer film including resin layers and a metal layer sandwiched between the resin layers. The metal layer is preferably an aluminum foil or an aluminum alloy foil for reducing weight. The resin layer may be, for example, a polymeric material such as polypropylene (PP), polyethylene (PE), nylon, or polyethylene terephthalate (PET). The laminate film may be heat-sealed to be formed into the shape of an exterior member.

The metal case is made of aluminum or an aluminum alloy, for example. As the aluminum alloy, an alloy containing an element such as magnesium, zinc, or silicon is preferable. If a transition metal such as iron, copper, nickel, or chromium is contained in the alloy, the content thereof is preferably set to 1% by mass or less.

6) Positive Electrode Terminal and Negative electrode Terminal

The positive electrode terminal may be made of, for example, a material which is electrically stable in the potential range of 3 V to 5 V based on redox potential of lithium, and has electrical conductivity. Specifically, the positive electrode terminal is made of aluminum or an aluminum alloy containing Mg, Ti, Zn, Mn, Fe, Cu, and Si or the like. The positive electrode terminal is preferably made of the same material as the positive electrode current collector in order to reduce contact resistance with the positive electrode current collector.

The negative electrode terminal may be made of a material which is electrochemically stable at the potential at which the negative electrode active material absorbs and releases Li, and has electrical conductivity. Specific examples of the material for the negative electrode terminal include copper, nickel, stainless steel, or aluminum. The negative electrode terminal is preferably made of the same material as the negative electrode current collector in order to reduce the contact resistance with the negative electrode current collector.

Next, the nonaqueous electrolyte battery according to the second embodiment will be more specifically described with reference to the drawings.

First, a nonaqueous electrolyte battery as an example according to the second embodiment will be described with reference to FIGS. 4 and 5.

FIG. 4 is a cross sectional view of a nonaqueous electrolyte battery as an example according to the second embodiment. FIG. 5 is an enlarged cross sectional view showing a portion A in FIG. 4.

A nonaqueous electrolyte battery 10 shown in FIGS. 4 and 5 includes a bag-shaped exterior member 2 shown in FIG. 4, an electrode group 1 shown in FIGS. 4 and 5, and a nonaqueous electrolyte (not shown). The electrode group 1 and the nonaqueous electrolyte are accommodated in the exterior member 2. The nonaqueous electrolyte is held in the electrode group 1.

The bag-shaped exterior member 2 is made of a laminate film including two resin layers and a metal layer sandwiched between the resin layers.

As shown in FIG. 4, the electrode group 1 is a coiled electrode group in a flat form. The coiled electrode group 1 in a flat form is formed by, as shown in FIG. 5, spirally winding a laminate which includes, from the outside to the inside, a negative electrode 3, a separator 4, a positive electrode 5, and a separator 4, and then press-forming the wound laminate.

The negative electrode 3 includes a negative electrode current collector 3a and a negative electrode layer 3b. The negative electrode layer 3b contains the active material for a battery according to the first embodiment. The negative electrode 3 in the outermost layer has a configuration in which a negative electrode layer 3b is formed on one side which is the internal surface of a negative electrode current collector 3a as shown in FIG. 5. In the other portion of the negative electrode 3, the negative electrode layers 3b are formed on both surfaces of the negative electrode current collector 3a.

The positive electrode 5 includes a positive electrode current collector 5a and positive electrode layers 5b formed on both surfaces of the positive electrode current collector 5a.

As shown in FIG. 4, in the vicinity of the outer peripheral edge of the coiled electrode group 1, a negative electrode terminal 6 is connected to the negative electrode current collector 3a in the outermost negative electrode 3, and a positive electrode terminal 7 is connected to the positive electrode current collector 5a in the inside positive electrode 5. The negative electrode terminal 6 and the positive electrode terminal 7 are extended out from the opening of the bag-shaped exterior member 2.

The nonaqueous electrolyte battery 10 shown in FIGS. 4 and 5 can be produced according to the following procedure, for example. First, an electrode group 1 is produced. The electrode group 1 is then enclosed in a bag-shaped exterior member 2. In this case, one ends of a negative electrode terminal 6 and positive electrode terminal 7 are protruded toward the outside of the exterior member 2. Next, the circumference of the exterior member 2 is heat-sealed while a part thereof remains unsealed. Next, for example, a liquid nonaqueous electrolyte is injected via the opening of the bag-shaped exterior member 2 which is not heat-sealed. Finally, the opening is heat-sealed, and thereby the coiled electrode group 1 and the liquid state nonaqueous electrolyte are completely sealed.

Figure 6:
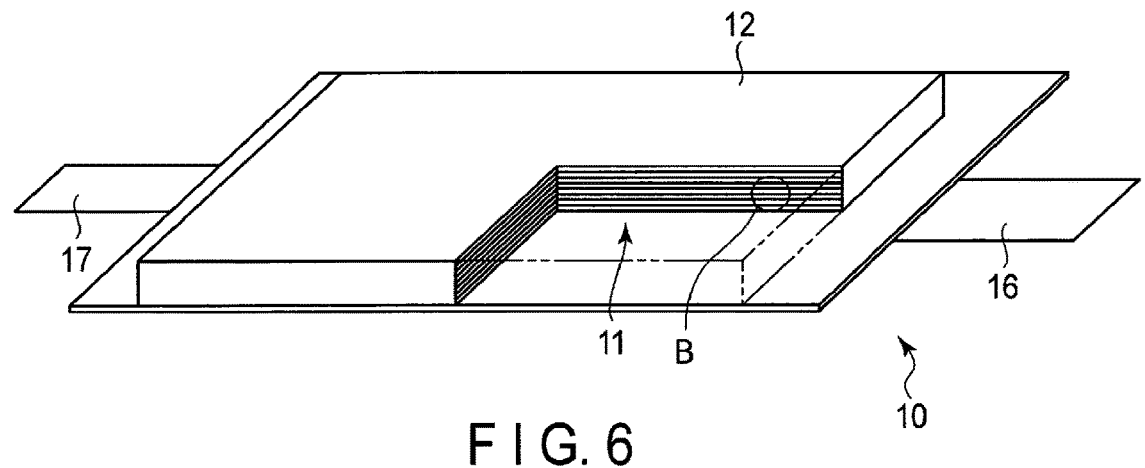
FIG. 6 is a partially cutaway perspective view schematically showing a nonaqueous electrolyte battery as another example according to a second embodiment.
Figure 7:
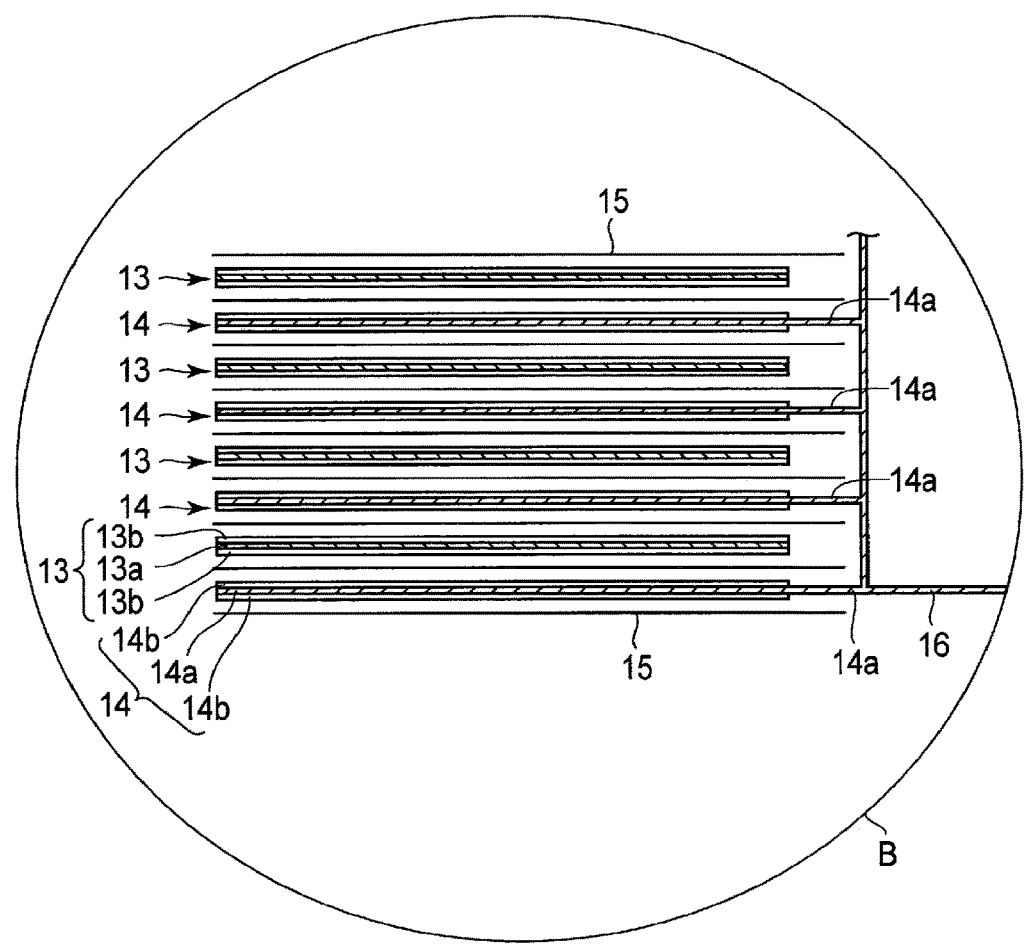
FIG. 7 is an enlarged cross sectional view showing a portion B in FIG. 6.

The nonaqueous electrolyte battery according to the second embodiment is not limited to the nonaqueous electrolyte battery as an example shown in FIGS. 4 and 5, and may be, for example, a battery having a structure shown in FIGS. 6 and 7.

FIG. 6 is a partially cutaway perspective view schematically showing a nonaqueous electrolyte battery as another example according to the second embodiment. FIG. 7 is an enlarged cross sectional view showing a portion B in FIG. 6.

A nonaqueous electrolyte battery 10 shown in FIGS. 6 and 7 includes an electrode group 11 shown in FIGS. 6 and 7, an exterior member 12 shown in FIG. 6, and a nonaqueous electrolyte (not shown). The electrode group 11 and the nonaqueous electrolyte are accommodated in the exterior member 12. The nonaqueous electrolyte is held in the electrode group 11.

The exterior member 12 is made of a laminate film including two resin layers and a metal layer sandwiched between the resin layers.

As shown in FIG. 7, the electrode group 11 is a stacked electrode group. As shown in FIG. 7, the stacked electrode group 11 has a structure in which positive electrodes 13 and negative electrodes 14 are alternately laminated with a separator 15 sandwiched therebetween.

The electrode group 11 includes a plurality of positive electrodes 13. Each of the plurality of positive electrodes 13 includes a positive electrode current collector 13a, and a positive electrode layer 13b supported on each of the both surfaces of the current collector 13a. The electrode group 11 includes a plurality of negative electrodes 14. Each of the plurality of negative electrodes 14 includes a negative electrode current collector 14a, and a negative electrode layer 14b supported on each of the both surfaces of the negative electrode current collector 14a. A part of the negative electrode current collector 14a of each of the negative electrodes 14 protrudes at one side from the negative electrode 14. The protruded part of the negative electrode current collector 14a is electrically connected to a strip-shaped negative electrode terminal 16. The tip of the strip-shaped negative electrode terminal 16 is extended out from the exterior member 12. Although not shown in the drawings, a part of the positive electrode current collector 13a of the positive electrode 13 protrudes from the positive electrode 13 at the side opposed to the protruded side of the negative electrode current collector 14a. The protruded part of the positive electrode current collector 13a from the positive electrode 13 is electrically connected to a strip-shaped positive electrode terminal 17. The tip of the strip-shaped positive electrode terminal 17 is opposed to the negative electrode terminal 16, and extended out from a side of the exterior member 12.

The nonaqueous electrolyte battery according to the second embodiment contains the active material for a battery according to the first embodiment. Therefore, the nonaqueous electrolyte battery according to the second embodiment can exhibit a high energy density and a high battery voltage, exhibit excellent life performance, and provide easy voltage management.

(Third Embodiment)

According to a third embodiment, there is provided a battery pack. The battery pack includes the nonaqueous electrolyte battery according to the second embodiment.

The battery pack according to the third embodiment can include one or more nonaqueous electrolyte batteries (unit cells) according to the second embodiment described above. The plurality of nonaqueous electrolyte batteries which may be included in the battery pack according to the third embodiment can be electrically connected in series or parallel, to constitute a battery module. The battery pack according to the third embodiment may include a plurality of battery modules.

Next, a battery pack as an example according to the third embodiment will be described with reference to the drawings.

FIG. 8 is an exploded perspective view of the battery pack as an example according to the third embodiment. FIG. 9 is a block diagram showing an electric circuit of the battery pack of FIG. 8.

A battery pack 20 shown in FIGS. 8 and 9 includes a plurality of unit cells 21. Each of the plurality of unit cells 21 are flat nonaqueous electrolyte battery 10 described with reference to FIGS. 4 and 5.

The plurality of unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 9.

A printed wiring board 24 is arranged opposed to the side plane where the negative electrode terminal 6 and the positive electrode terminal 7 of the unit cell 21 are extended. A thermistor 25, a protective circuit 26, and an energizing terminal 27 to an external device are mounted on the printed wiring board 24 as shown in FIG. 9. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirers 32 and 33 formed in the printed wiring board 24.

The thermistor 25 detects the temperature of the unit cells 21 and the detection signal is sent to the protective circuit 26. The protective circuit 26 can shut down a plus-side wirer 34a and a minus-side wirer 34b between the protective circuit 26 and the energizing terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 8 and 9, wirers 35 for voltage detection are connected to each of the unit cells 21. Detection signals are sent to the protective circuit 26 through the wirers 35.

Protective sheets 36 including rubber or resin are arranged on each of three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tube.

In FIGS. 8 and 9, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which cycle characteristics when large-current is taken out are desired. Specific examples of these applications include application as a battery of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a battery mounted to a vehicle.

The battery pack according to the third embodiment includes the nonaqueous electrolyte battery according to the second embodiment. Therefore, the battery pack according to the third embodiment can exhibit a high energy density and a high battery voltage, exhibit excellent life performance, and provide easy voltage management.

(Fourth Embodiment)

According to a fourth embodiment, there is provided a battery module. The battery module includes nonaqueous electrolyte batteries. Each of the nonaqueous electrolyte batteries is the nonaqueous electrolyte battery according to the second embodiment. The nonaqueous electrolyte batteries are electrically connected to each other in series.

The battery module according to the fourth embodiment can further include a lead for electrically connecting the plurality of nonaqueous electrolyte batteries to each other. The lead is preferably made of the same material as that of a terminal of the nonaqueous electrolyte battery in order to reduce contact resistance with the terminal of the nonaqueous electrolyte battery with which the lead is connected, for example.

For example, the battery module as an example according to the fourth embodiment can include five nonaqueous electrolyte batteries. As described above, the nonaqueous electrolyte battery according to the second embodiment can exhibit a high battery voltage. Therefore, the battery module including the five nonaqueous electrolyte batteries according to the second embodiment connected to each other in series can show the same operating voltage as that of a lead storage battery, for example.

Alternatively, a battery module as another example according to the fourth embodiment can include six nonaqueous electrolyte batteries.

The battery pack according to the third embodiment can include the battery module according to the fourth embodiment.

Next, the battery module as an example according to the fourth embodiment will be described in more detail with reference to the drawings.

FIG. 10 is a schematic perspective view of a battery module as an example according to the fourth embodiment. A battery module 23 shown in FIG. 10 includes five unit cells 21. Each of the five unit cells 21 is the square type nonaqueous electrolyte battery as an example according to the second embodiment.

The battery module 23 shown in FIG. 10 further includes four leads 40. A lead 40 connects a negative electrode terminal 6 of one unit cell 21 and a positive electrode terminal 7 of another unit cell 21. Thus, the five unit cells 21 are electrically connected to each other in series via the four leads 40. That is, the battery module 23 of FIG. 10 is a battery module including the five unit cells connected in series.

As shown in FIG. 10, the positive electrode terminal 7 of one unit cell 21 among the five unit cells 21 is connected to a positive electrode-side lead 28 for external connection. The negative electrode terminal 6 of another unit cell 21 among the five unit cells 21 is connected to a negative electrode-side lead 30 for external connection.

Since the battery module according to the fourth embodiment includes the nonaqueous electrolyte batteries each of which is one according to the second embodiment, the battery module can provide easy charge-and-discharge management, exhibit excellent life performance, and exhibit a high energy density and a high battery voltage.

EXAMPLES

Hereinafter, the above embodiments will be described in more detail by way of Examples. The identification of a crystal phase and estimation of a crystal structure of each of the synthesized composite oxides having an orthorhombic crystal structure were made by a powder X-ray diffraction method using Cu—Kα rays. The composition of a product was analyzed by an ICP method to confirm that a target product was obtained.

Synthesis

Example A

Examples A-1 to A-12

In Examples A-1 to A-12, products of Examples A-1 to A-12 were synthesized according to the following procedure. Target compositions of Examples A-1 to A-12 are shown in the following Table 1.

First, commercially available oxides and carbonate reagents shown in the following Table 1 were provided as starting materials so that molar ratios shown in Table 1 were satisfied and the total weight was 50 g. Since the vaporized amount corresponding to 3% was confirmed as the amount of lithium carbonate as a result of analyzing the vaporized amount of lithium ions during firing in a preliminary experiment, lithium carbonate was provided in a higher amount than that of the target composition by 3%.

Next, the starting materials provided as described above were mixed, and the mixture was put into an agate pod for ball mills (300 ml internal volume). Agate balls having diameters of 10 mm and 5 mm were put in an amount of 1:1 into the pod so that the volume of the agate balls was one third of the pod internal volume. Then, 50 ml of ethanol was put into the pod, and wet mixing was performed for 60 minutes at 120 rpm to obtain a mixture. Since the materials are uniformly mixed by such wet mixing, a target single crystal phase can be obtained.

Next, the thus obtained mixture was put into an electric furnace, and heat-treated according to the following procedure.

First, the mixture was subjected to calcination in an air atmosphere at a temperature of 650° C. for 6 hours. Then, the powder obtained by calcination was taken out from the furnace, reground, and mixed. Thus, the mixture was previously subjected to calcination to decompose carbonate or the like in the materials, and then remixed. Thereby, material particles can adhere tightly to each other in the main sintering, and as a result, particles having uniform and high crystallinity can be obtained.

Subsequently, the thus obtained mixture was subjected to first sintering at a temperature of 900° C. for 6 hours. After the sintering, the sintered powder was taken out from the furnace, and remixed.

Subsequently, the remixed sintered powder was put into the furnace, and subjected to second sintering at a temperature of 900° C. in an air atmosphere for 6 hours. Then, the temperature in the electric furnace was held at 400° C. for 2 hours, and the sintered powder was then promptly cooled to room temperature. Then, the sintered powder was taken out from the furnace and remixed. The powder obtained after the second sintering, i.e., as a result of sintering at a temperature of 900° C. for a total of 12 hours was used as each of products of Examples A-1 to A-12.

Example A-13

In Example A-13, a product of Example A-13 was synthesized according to the same procedure as that of Example A-6 except that sintering was performed under a flow of nitrogen gas containing 3% of hydrogen in a reduction atmosphere in the electric furnace.

TABLE 1

| A series | Target Composition | Li Source/ Amount | M1 Source/ Amount | M2 Source/ Amount | Ti Source/ Amount | M3 Source/ Amount |
|---|---|---|---|---|---|---|
| Comparative Example A-1 | $Li_2SrTi_6O_{14}$ | $Li_2CO_3$/1.0 | $SrCO_3$/1.0 | — | $TiO_2$/6.0 | — |
| Comparative Example A-2 | $Li_2MgTi_6O_{14}$ | $Li_2CO_3$/1.0 | MgO/1.0 | — | $TiO_2$/6.0 | — |
| Comparative Example A-3 | $Li_2BaTi_{5.9}Al_{0.1}O_{14}$ | $Li_2CO_3$/1.0 | $BaCO_3$/1.0 | — | $TiO_2$/5.9 | $Al_2O_3$/0.05 |
| Comparative Example A-4 | $Li_2(Sr_{0.75}Na_{0.25})Ti_6O_{14}$ | $Li_2CO_3$/1.0 | $SrCO_3$/0.75 | $Na_2CO_3$/0.125 | $TiO_2$/6.0 | — |
| Comparative Example A-5 | $Li_2SrTi_{5.25}Nb_{0.75}O_{14}$ | $Li_2CO_3$/1.0 | $SrCO_3$/1.0 | | $TiO_2$/5.25 | $Nb_2O_5$/0.375 |

TABLE 1-continued

| A series | Target Composition | Li Source/ Amount | M1 Source/ Amount | M2 Source/ Amount | Ti Source/ Amount | M3 Source/ Amount |
|---|---|---|---|---|---|---|
| Comparative Example A-6 | $Li_2Na_2Ti_6O_{14}$ | $Li_2CO_3/1.0$ | — | $Na_2CO_3/1.0$ | $TiO_2/6.0$ | — |
| Comparative Example A-7 | $Ti_2Nb_4O_{14}$ ($TiNb_2O_7$) | — | — | — | $TiO_2/1.0$ | $Nb_2O_5/1.0$ |
| Example A-1 | $Li_2(Sr_{0.99}Na_{0.01})Ti_{5.99}Nb_{0.01}O_{14}$ | $Li_2CO_3/1.03$ | $SrCO_3/0.99$ | $Na_2CO_3/0.005$ | $TiO_2/5.99$ | $Nb_2O_5/0.005$ |
| Example A-2 | $Li_2(Sr_{0.95}Na_{0.05})Ti_{5.95}Nb_{0.05}O_{14}$ | $Li_2CO_3/1.03$ | $SrCO_3/0.95$ | $Na_2CO_3/0.025$ | $TiO_2/5.95$ | $Nb_2O_5/0.025$ |
| Example A-3 | $Li_2(Sr_{0.90}Na_{0.10})Ti_{5.90}Nb_{0.10}O_{14}$ | $Li_2CO_3/1.03$ | $SrCO_3/0.90$ | $Na_2CO_3/0.05$ | $TiO_2/5.90$ | $Nb_2O_5/0.05$ |
| Example A-4 | $Li_2(Sr_{0.75}Na_{0.25})Ti_{5.75}Nb_{0.25}O_{14}$ | $Li_2CO_3/1.03$ | $SrCO_3/0.75$ | $Na_2CO_3/0.125$ | $TiO_2/5.75$ | $Nb_2O_5/0.125$ |
| Example A-5 | $Li_2(Sr_{0.50}Na_{0.50})Ti_{5.50}Nb_{0.50}O_{14}$ | $Li_2CO_3/1.03$ | $SrCO_3/0.50$ | $Na_2CO_3/0.25$ | $TiO_2/5.50$ | $Nb_2O_5/0.25$ |
| Example A-6 | $Li_2(Sr_{0.25}Na_{0.75})Ti_{5.25}Nb_{0.75}O_{14}$ | $Li_2CO_3/1.03$ | $SrCO_3/0.25$ | $Na_2CO_3/0.375$ | $TiO_2/5.25$ | $Nb_2O_5/0.375$ |
| Example A-7 | $Li_2(Sr_{0.10}Na_{0.90})Ti_{5.10}Nb_{0.90}O_{14}$ | $Li_2CO_3/1.03$ | $SrCO_3/0.10$ | $Na_2CO_3/0.45$ | $TiO_2/5.10$ | $Nb_2O_5/0.45$ |
| Example A-8 | $Li_2(Sr_{0.05}Na_{0.95})Ti_{5.05}Nb_{0.95}O_{14}$ | $Li_2CO_3/1.03$ | $SrCO_3/0.05$ | $Na_2CO_3/0.475$ | $TiO_2/5.05$ | $Nb_2O_5/0.475$ |
| Example A-9 | $Li_2(Sr_{0.01}Na_{0.99})Ti_{5.01}Nb_{0.99}O_{14}$ | $Li_2CO_3/1.03$ | $SrCO_3/0.01$ | $Na_2CO_3/0.495$ | $TiO_2/5.01$ | $Nb_2O_5/0.495$ |
| Example A-10 | $Li_{2.2}(Sr_{0.25}Na_{0.75})Ti_{5.25}Nb_{0.75}O_{14}$ | $Li_2CO_3/1.13$ | $SrCO_3/0.25$ | $Na_2CO_3/0.375$ | $TiO_2/5.25$ | $Nb_2O_5/0.375$ |
| Example A-11 | $Li_3(Sr_{0.25}Na_{0.75})Ti_{5.25}Nb_{0.75}O_{14}$ | $Li_2CO_3/1.55$ | $SrCO_3/0.25$ | $Na_2CO_3/0.375$ | $TiO_2/5.25$ | $Nb_2O_5/0.375$ |
| Example A-12 | $Li_6(Sr_{0.25}Na_{0.75})Ti_{5.25}Nb_{0.75}O_{14}$ | $Li_2CO_3/3.09$ | $SrCO_3/0.25$ | $Na_2CO_3/0.375$ | $TiO_2/5.25$ | $Nb_2O_5/0.375$ |
| Example A-13 | $Li_2(Sr_{0.25}Na_{0.75})Ti_{5.25}Nb_{0.75}O_{13.5}$ | $Li_2CO_3/1.03$ | $SrCO_3/0.25$ | $Na_2CO_3/0.375$ | $TiO_2/5.25$ | $Nb_2O_5/0.375$ |

Comparative Examples A-1 to A-7

In Comparative Example A-1, a compound $Li_2SrTi_6O_{14}$ was synthesized by a solid reaction method described in Electrochemistry communications 5 (2003) pp.435-438. Starting materials and molar ratios thereof were as described in the above Table 1.

In Comparative Examples A-2 and A-3, a compound $Li_2MgTi_6O_{14}$ and a compound $Li_2BaTi_{5.9}Al_{0.1}O_{14}$ described in Japanese Patent No. 4237659 were synthesized according to the same procedure as that of Comparative Example A-1 except that starting materials and molar ratios thereof were as described in the above Table 1.

In Comparative Examples A-4 to A-6, a compound described in the above Table 1 was synthesized according to the same procedure as that of Comparative Example A-1 except that starting materials and molar ratios thereof were as described in the above Table 1. In Comparative Example A-7, a compound was synthesized according to the same procedure as that of Comparative Example A-1 except that starting materials and molar ratios thereof were as described in the above Table 1 and a temperature of the main sintering was 1100° C.

(Confirmation of Composition of Product)

The compositions of the products of Examples A-1 to A-13 and Comparative Examples A-1 to A-7 were analyzed by the previously described ICP method. The results are shown in the following Table 2.

As shown in Table 2, the subscript of oxygen in a composition formula in the product of Example A-13 was 13.5. That is, oxygen defects in the product of Example A-13 slightly occurred with respect to that of Example A-6.

TABLE 2

| | | $Li_xM1_{1-y}M2_yTi_{6-z}M3_zO_{14}$ | | |
|---|---|---|---|---|
| A series | Composition | x | y | z |
| Comparative Example A-1 | $Li_2SrTi_6O_{14}$ | 2.0 | 0 | 0 |
| Comparative Example A-2 | $Li_2MgTi_6O_{14}$ | 2.0 | 0 | 0 |
| Comparative Example A-3 | $Li_2BaTi_{5.9}Al_{0.1}O_{14}$ | 2.0 | 0 | 0.1 |
| Comparative Example A-4 | $Li_2(Sr_{0.75}Na_{0.25})Ti_6O_{14}$ | 2.0 | 0.25 | 0 |
| Comparative Example A-5 | $Li_2SrTi_{5.25}Nb_{0.75}O_{14}$ | 2.0 | 0 | 0.75 |
| Comparative Example A-6 | $Li_2Na_2Ti_6O_{14}$ | 2.0 | 2.0 | 0 |
| Comparative Example A-7 | $Ti_2Nb_4O_{14}$ ($TiNb_2O_7$) | 0 | 0 | 4 |
| Example A-1 | $Li_2(Sr_{0.99}Na_{0.01})Ti_{5.99}Nb_{0.01}O_{14}$ | 2.0 | 0.01 | 0.01 |
| Example A-2 | $Li_2(Sr_{0.95}Na_{0.05})Ti_{5.95}Nb_{0.05}O_{14}$ | 2.0 | 0.05 | 0.05 |
| Example A-3 | $Li_2(Sr_{0.90}Na_{0.10})Ti_{5.90}Nb_{0.10}O_{14}$ | 2.0 | 0.10 | 0.10 |
| Example A-4 | $Li_2(Sr_{0.75}Na_{0.25})Ti_{5.75}Nb_{0.25}O_{14}$ | 2.0 | 0.25 | 0.25 |
| Example A-5 | $Li_2(Sr_{0.50}Na_{0.50})Ti_{5.50}Nb_{0.50}O_{14}$ | 2.0 | 0.50 | 0.50 |
| Example A-6 | $Li_2(Sr_{0.25}Na_{0.75})Ti_{5.25}Nb_{0.75}O_{14}$ | 2.0 | 0.75 | 0.75 |
| Example A-7 | $Li_2(Sr_{0.10}Na_{0.90})Ti_{5.10}Nb_{0.90}O_{14}$ | 2.0 | 0.90 | 0.90 |
| Example A-8 | $Li_2(Sr_{0.05}Na_{0.95})Ti_{5.05}Nb_{0.95}O_{14}$ | 2.0 | 0.95 | 0.95 |
| Example A-9 | $Li_2(Sr_{0.01}Na_{0.99})Ti_{5.01}Nb_{0.99}O_{14}$ | 2.0 | 0.99 | 0.99 |
| Example A-10 | $Li_{2.2}(Sr_{0.25}Na_{0.75})Ti_{5.25}Nb_{0.75}O_{14}$ | 2.2 | 0.75 | 0.75 |
| Example A-11 | $Li_3(Sr_{0.25}Na_{0.75})Ti_{5.25}Nb_{0.75}O_{14}$ | 3.0 | 0.75 | 0.75 |
| Example A-12 | $Li_6(Sr_{0.25}Na_{0.75})Ti_{5.25}Nb_{0.75}O_{14}$ | 6.0 | 0.75 | 0.75 |
| Example A-13 | $Li_2(Sr_{0.25}Na_{0.75})Ti_{5.25}Nb_{0.75}O_{13.5}$ | 2.0 | 0.75 | 0.75 |

(Powder X-Ray Diffraction Measurement)

The products of Examples A-1 to A-13 and the products of Comparative Examples A-1 to A-7 were subjected to powder X-ray diffraction measurement according to the previously described procedure.

For each of the products obtained from the results of powder X-ray diffraction measurement, a plane index corresponding to a strongest diffraction peak L appearing within the range of $17.0° \leq 2\theta \leq 18.5°$, a value $2\theta_L$ of $2\theta$ of the diffraction peak L, a plane index corresponding to a strongest diffraction peak H appearing within the range of $18.5° < 2\theta \leq 19.5°$, a value $2\theta_H$ of $2\theta$ of the diffraction peak H, and an intensity ratio $I_L/I_H$ of the diffraction peaks are shown in the following Table 3. In Comparative Example A-7, not an orthorhombic crystal structure but a monoclinic crystal structure was obtained.

As a result of analyzing the above results of the powder X-ray diffraction method according to the Rietveld method, it was found that the products obtained in Examples A-1 to 13 are an orthorhombic compound having symmetry of a space group Cmca shown in FIG. 2 or an orthorhombic compound having symmetry of a space group Fmmm shown in FIG. 3. The crystal phases and space groups of the products are summarized in the following Table 3.

in a nitrogen atmosphere at 700° C. for 2 hours. A product obtained by heating was used as the product of Example A-14.

As a result of analyzing the product of Example A-14 with TEM-EDX (Transmission Electron Microscopy and Energy Dispersive X-ray Spectroscopy), it was found that the surface of the particles of the product of Example A-6 is covered with carbon.

Example A-15

In Example A-15, according to the following procedure, the surface of the product of Example A-6 was covered with lithium titanate $Li_4Ti_5O_{12}$ using a tumbling fluidized bed granulator to synthesize a product of Example A-15.

Specifically, first, lithium ethoxide and titanium tetraisopropoxide were mixed at a molar ratio of Li:Ti=4:5 to prepare a sol-gel liquid. Next, the prepared sol gel liquid was sprayed to a part of the product of Example A-6 in a tumbling fluidized bed. Thus, a composite in which the sol-gel liquid adhered to the surface of the particles was obtained. The composite was fired in an air atmosphere at 600° C. for 2 hours. The sol-gel liquid was changed into spinel type lithium titanate by firing. The thus obtained product was used as the product of Example A-15.

TABLE 3

| A series | Composition | Crystal Phase | Space Group | Diffraction Peak L Plane Index | Diffraction Peak L 2θ/deg | Diffraction Peak H Plane Index | Diffraction Peak H 2θ/deg | Intensity Ratio of Diffraction Peaks $I_L/I_H$ |
|---|---|---|---|---|---|---|---|---|
| Comparative Example A-1 | $Li_2SrTi_6O_{14}$ | Orthorhombic | Cmca | (112) | 18.27 | (220) | 19.25 | 0.60 |
| Comparative Example A-2 | $Li_2MgTi_6O_{14}$ | Orthorhombic | Cmca | (112) | 18.35 | (220) | 19.34 | 0.52 |
| Comparative Example A-3 | $Li_2BaTi_{5.9}Al_{0.1}O_{14}$ | Orthorhombic | Cmca | (021) | 17.58 | (220) | 19.28 | 0.43 |
| Comparative Example A-4 | $Li_2(Sr_{0.75}Na_{0.25})Ti_6O_{14}$ | Orthorhombic | Cmca | (112) | 18.27 | (220) | 19.27 | 0.59 |
| Comparative Example A-5 | $Li_2SrTi_{5.25}Nb_{0.75}O_{14}$ | Orthorhombic | Cmca | (112) | 18.29 | (220) | 19.29 | 0.63 |
| Comparative Example A-6 | $Li_2Na_2Ti_6O_{14}$ | Orthorhombic | Fmmm | (111) | 18.14 | (202) | 19.09 | 3.06 |
| Comparative Example A-7 | $Ti_2Nb_4O_{14}$ ($TiNb_2O_7$) | Monoclinic | C2/m | — | — | — | — | — |
| Example A-1 | $Li_2(Sr_{0.99}Na_{0.01})Ti_{5.99}Nb_{0.01}O_{14}$ | Orthorhombic | Cmca | (112) | 18.26 | (220) | 19.25 | 0.60 |
| Example A-2 | $Li_2(Sr_{0.95}Na_{0.05})Ti_{5.95}Nb_{0.05}O_{14}$ | Orthorhombic | Cmca | (112) | 18.26 | (220) | 19.25 | 0.65 |
| Example A-3 | $Li_2(Sr_{0.90}Na_{0.10})Ti_{5.90}Nb_{0.10}O_{14}$ | Orthorhombic | Cmca | (112) | 18.24 | (220) | 19.23 | 0.78 |
| Example A-4 | $Li_2(Sr_{0.75}Na_{0.25})Ti_{5.75}Nb_{0.25}O_{14}$ | Orthorhombic | Cmca | (112) | 18.22 | (220) | 19.21 | 1.07 |
| Example A-5 | $Li_2(Sr_{0.50}Na_{0.50})Ti_{5.50}Nb_{0.50}O_{14}$ | Orthorhombic | Cmca | (112) | 18.19 | (220) | 19.18 | 1.56 |
| Example A-6 | $Li_2(Sr_{0.25}Na_{0.75})Ti_{5.25}Nb_{0.75}O_{14}$ | Orthorhombic | Fmmm | (111) | 18.16 | (202) | 19.15 | 2.21 |
| Example A-7 | $Li_2(Sr_{0.10}Na_{0.90})Ti_{5.10}Nb_{0.90}O_{14}$ | Orthorhombic | Fmmm | (111) | 18.15 | (202) | 19.16 | 2.28 |
| Example A-8 | $Li_2(Sr_{0.05}Na_{0.95})Ti_{5.05}Nb_{0.95}O_{14}$ | Orthorhombic | Fmmm | (111) | 18.15 | (202) | 19.15 | 2.36 |
| Example A-9 | $Li_2(Sr_{0.01}Na_{0.99})Ti_{5.01}Nb_{0.99}O_{14}$ | Orthorhombic | Fmmm | (111) | 18.15 | (202) | 19.15 | 2.99 |
| Example A-10 | $Li_{2.2}(Sr_{0.25}Na_{0.75})Ti_{5.25}Nb_{0.75}O_{14}$ | Orthorhombic | Fmmm | (111) | 18.15 | (202) | 19.16 | 2.23 |
| Example A-11 | $Li_3(Sr_{0.25}Na_{0.75})Ti_{5.25}Nb_{0.75}O_{14}$ | Orthorhombic | Fmmm | (111) | 18.14 | (202) | 19.15 | 2.51 |
| Example A-12 | $Li_6(Sr_{0.25}Na_{0.75})Ti_{5.25}Nb_{0.75}O_{14}$ | Orthorhombic | Fmmm | (111) | 18.13 | (202) | 19.14 | 2.63 |
| Example A-13 | $Li_2(Sr_{0.25}Na_{0.75})Ti_{5.25}Nb_{0.75}O_{13.5}$ | Orthorhombic | Fmmm | (111) | 18.16 | (202) | 19.14 | 2.33 |

Figure 11:
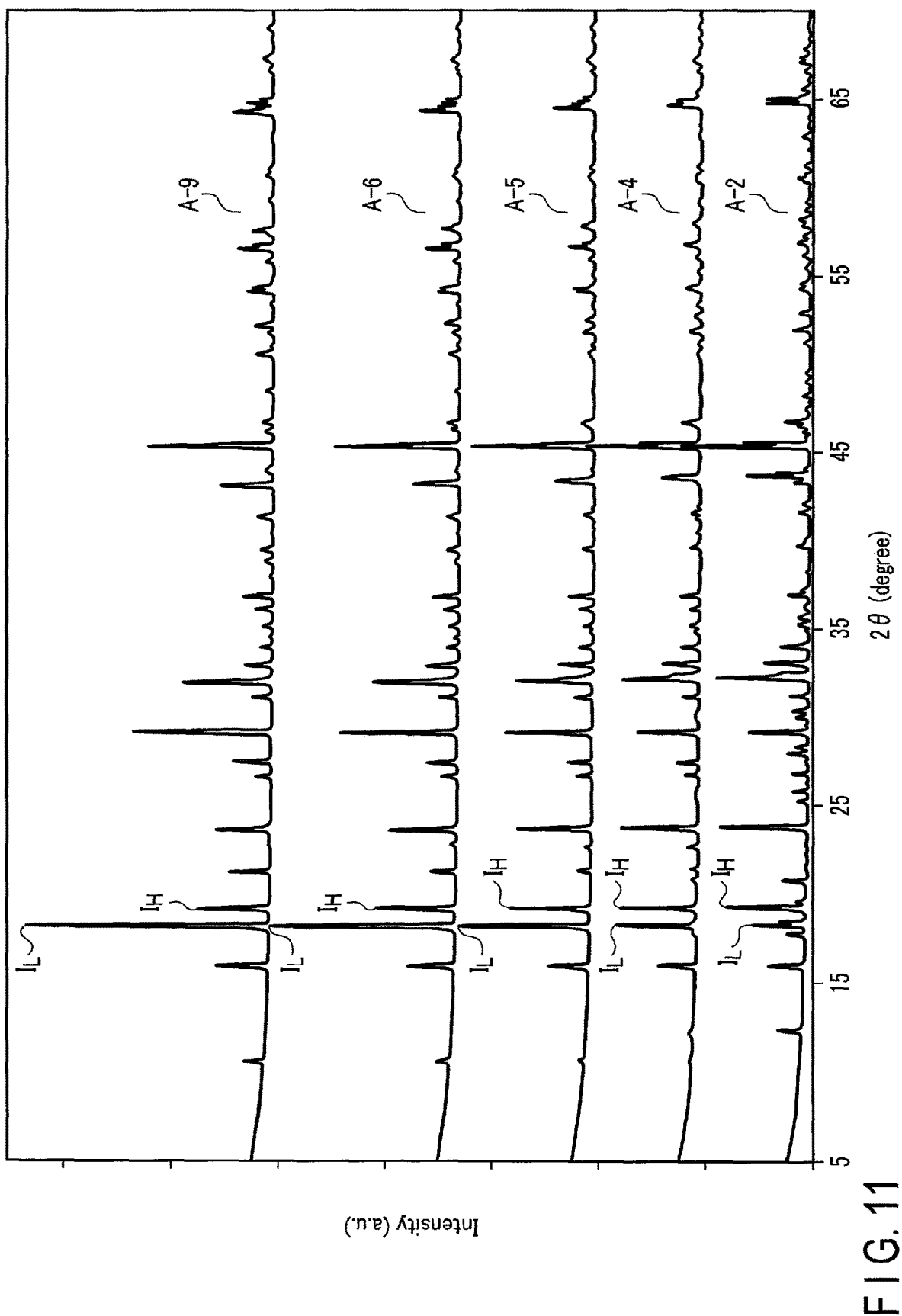
FIG. 11 shows X-ray diffraction diagrams of active materials for a battery of Examples A-2, A-4, A-5, A-6, and A-9.

FIG. 11 shows X-ray charts of Examples A-2, A-4, A-5, A-6, and A-2 as typical X-ray charts.

Example A-14

In Example A-14, a product of Example A-14 was synthesized according to the following procedure.

First, a part of the product of Example A-6 was immersed into a sucrose aqueous solution having a concentration adjusted to 10% by weight. Then, the sucrose aqueous solution was filtered. Then, the filtration residue was heated As a result of analyzing the product of Example A-15 with TEM-EDX (Transmission Electron Microscopy and Energy Dispersive X-ray Spectroscopy) and electron diffraction, it was found that the surface of the particles of the product of Example A-6 is covered with a layer made of spinel type lithium titanate $Li_4Ti_5O_{12}$.

Example B

In Examples B-1 to B-11, products of Example B-1 to B-11 were obtained in the same manner as in Examples A-1 to A-12 except that, in order to obtain products having target compositions shown in the following Table 4, starting materials shown in Table 4 were used. The molar ratios of the starting materials were set to ratios shown in the following Table 4.

Example C

In Examples C-1 to C-7, products of Example C-1 to C-7 were obtained in the same manner as in Examples A-1 to A-12 except that, in order to obtain products having target

TABLE 4

| B series | Target Composition | Li Source/ Amount | M1 Source/ Amount | M2 Source/ Amount | Ti Source/ Amount | M3 Source/ Amount |
|---|---|---|---|---|---|---|
| Example B-1 | $Li_2(Ba_{0.75}Na_{0.25})Ti_{5.75}Nb_{0.25}O_{14}$ | $Li_2CO_3$/1.03 | $BaCO_3$/0.75 | $Na_2CO_3$/0.125 | $TiO_2$/5.75 | $Nb_2O_5$/0.125 |
| Example B-2 | $Li_2(Ba_{0.50}Na_{0.50})Ti_{5.50}Nb_{0.50}O_{14}$ | $Li_2CO_3$/1.03 | $BaCO_3$/0.50 | $Na_2CO_3$/0.25 | $TiO_2$/5.50 | $Nb_2O_5$/0.25 |
| Example B-3 | $Li_2(Ba_{0.25}Na_{0.75})Ti_{5.25}Nb_{0.75}O_{14}$ | $Li_2CO_3$/1.03 | $BaCO_3$/0.25 | $Na_2CO_3$/0.375 | $TiO_2$/5.25 | $Nb_2O_5$/0.375 |
| Example B-4 | $Li_2(Ca_{0.25}Na_{0.75})Ti_{5.25}Nb_{0.75}O_{14}$ | $Li_2CO_3$/1.03 | $CaCO_3$/0.25 | $Na_2CO_3$/0.375 | $TiO_2$/5.25 | $Nb_2O_5$/0.375 |
| Example B-5 | $Li_2(Mg_{0.25}Na_{0.75})Ti_{5.25}Nb_{0.75}O_{14}$ | $Li_2CO_3$/1.03 | MgO/0.25 | $Na_2CO_3$/0.375 | $TiO_2$/5.25 | $Nb_2O_5$/0.375 |
| Example B-6 | $Li_2(Sr_{0.25}Ba_{0.25}Na_{0.50})Ti_{5.50}Nb_{0.50}O_{14}$ | $Li_2CO_3$/1.03 | $SrCO_3$/0.25 $BaCO_3$/0.25 | $Na_2CO_3$/0.25 | $TiO_2$/5.50 | $Nb_2O_5$/0.25 |
| Example B-7 | $Li_2(Sr_{0.25}Ca_{0.25}Na_{0.50})Ti_{5.50}Nb_{0.50}O_{14}$ | $Li_2CO_3$/1.03 | $SrCO_3$/0.25 $CaCO_3$/0.25 | $Na_2CO_3$/0.25 | $TiO_2$/5.50 | $Nb_2O_5$/0.25 |
| Example B-8 | $Li_2(Sr_{0.25}Mg_{0.25}Na_{0.50})Ti_{5.50}Nb_{0.50}O_{14}$ | $Li_2CO_3$/1.03 | $SrCO_3$/0.25 MgO/0.25 | $Na_2CO_3$/0.25 | $TiO_2$/5.50 | $Nb_2O_5$/0.25 |
| Example B-9 | $Li_2(Ba_{0.25}Ca_{0.25}Na_{0.50})Ti_{5.50}Nb_{0.50}O_{14}$ | $Li_2CO_3$/1.03 | $BaCO_3$/0.25 $CaCO_3$/0.25 | $Na_2CO_3$/0.25 | $TiO_2$/5.50 | $Nb_2O_5$/0.25 |
| Example B-10 | $Li_2(Ba_{0.25}Mg_{0.25}Na_{0.50})Ti_{5.50}Nb_{0.50}O_{14}$ | $Li_2CO_3$/1.03 | $BaCO_3$/0.25 MgO/0.25 | $Na_2CO_3$/0.25 | $TiO_2$/5.50 | $Nb_2O_5$/0.25 |
| Example B-11 | $Li_2(Ca_{0.25}Mg_{0.25}Na_{0.50})Ti_{5.50}Nb_{0.50}O_{14}$ | $Li_2CO_3$/1.03 | $CaCO_3$/0.25 MgO/0.25 | $Na_2CO_3$/0.25 | $TiO_2$/5.50 | $Nb_2O_5$/0.25 |

Products of Examples B-1 to B-11 were subjected to composition analysis and powder X-ray diffraction measurement in the same manner as in Example A series. The results are shown in the following Tables 5 and 6.

compositions shown in the following Table 7, starting materials shown in Table 7 were used. The molar ratios of the starting materials were set to ratios shown in the following Table 7.

TABLE 5

| | | $Li_xM1_{1-y}M2_yTi_{6-z}M3_zO_{14}$ | | |
|---|---|---|---|---|
| B series | Composition | x | y | z |
| Example B-1 | $Li_2(Ba_{0.75}Na_{0.25})Ti_{5.75}Nb_{0.25}O_{14}$ | 2.0 | 0.25 | 0.25 |
| Example B-2 | $Li_2(Ba_{0.50}Na_{0.50})Ti_{5.50}Nb_{0.50}O_{14}$ | 2.0 | 0.50 | 0.50 |
| Example B-3 | $Li_2(Ba_{0.25}Na_{0.75})Ti_{5.25}Nb_{0.75}O_{14}$ | 2.0 | 0.75 | 0.75 |
| Example B-4 | $Li_2(Ca_{0.25}Na_{0.75})Ti_{5.25}Nb_{0.75}O_{14}$ | 2.0 | 0.75 | 0.75 |
| Example B-5 | $Li_2(Mg_{0.25}Na_{0.75})Ti_{5.25}Nb_{0.75}O_{14}$ | 2.0 | 0.75 | 0.75 |
| Example B-6 | $Li_2(Sr_{0.25}Ba_{0.25}Na_{0.50})Ti_{5.50}Nb_{0.50}O_{14}$ | 2.0 | 0.5 | 0.5 |
| Example B-7 | $Li_2(Sr_{0.25}Ca_{0.25}Na_{0.50})Ti_{5.50}Nb_{0.50}O_{14}$ | 2.0 | 0.5 | 0.5 |
| Example B-8 | $Li_2(Sr_{0.25}Mg_{0.25}Na_{0.50})Ti_{5.50}Nb_{0.50}O_{14}$ | 2.0 | 0.5 | 0.5 |
| Example B-9 | $Li_2(Ba_{0.25}Ca_{0.25}Na_{0.50})Ti_{5.50}Nb_{0.50}O_{14}$ | 2.0 | 0.5 | 0.5 |
| Example B-10 | $Li_2(Ba_{0.25}Mg_{0.25}Na_{0.50})Ti_{5.50}Nb_{0.50}O_{14}$ | 2.0 | 0.5 | 0.5 |
| Example B-11 | $Li_2(Ca_{0.25}Mg_{0.25}Na_{0.50})Ti_{5.50}Nb_{0.50}O_{14}$ | 2.0 | 0.5 | 0.5 |

TABLE 6

| | | | | Diffraction Peak L | | Diffraction Peak H | | Intensity Ratio of Diffraction Peaks |
|---|---|---|---|---|---|---|---|---|
| B series | Composition | Crystal Phase | Space Group | Plane Index | 2θ/deg | Plane Index | 2θ/deg | $I_L/I_H$ |
| Example B-1 | $Li_2(Ba_{0.75}Na_{0.25})Ti_{5.75}Nb_{0.25}O_{14}$ | Orthorhombic | Cmca | (021) | 17.55 | (220) | 19.24 | 0.66 |
| Example B-2 | $Li_2(Ba_{0.50}Na_{0.50})Ti_{5.50}Nb_{0.50}O_{14}$ | Orthorhombic | Cmca | (021) | 17.52 | (220) | 19.21 | 0.85 |
| Example B-3 | $Li_2(Ba_{0.25}Na_{0.75})Ti_{5.25}Nb_{0.75}O_{14}$ | Orthorhombic | Fmmm | (111) | 18.18 | (202) | 19.17 | 1.55 |
| Example B-4 | $Li_2(Ca_{0.25}Na_{0.75})Ti_{5.25}Nb_{0.75}O_{14}$ | Orthorhombic | Fmmm | (111) | 18.26 | (202) | 19.27 | 0.98 |
| Example B-5 | $Li_2(Mg_{0.25}Na_{0.75})Ti_{5.25}Nb_{0.75}O_{14}$ | Orthorhombic | Fmmm | (111) | 18.28 | (202) | 19.28 | 1.05 |
| Example B-6 | $Li_2(Sr_{0.25}Ba_{0.25}Na_{0.50})Ti_{5.50}Nb_{0.50}O_{14}$ | Orthorhombic | Cmca | (112) | 18.14 | (220) | 19.09 | 1.36 |
| Example B-7 | $Li_2(Sr_{0.25}Ca_{0.25}Na_{0.50})Ti_{5.50}Nb_{0.50}O_{14}$ | Orthorhombic | Cmca | (112) | 18.27 | (220) | 19.26 | 1.55 |
| Example B-8 | $Li_2(Sr_{0.25}Mg_{0.25}Na_{0.50})Ti_{5.50}Nb_{0.50}O_{14}$ | Orthorhombic | Cmca | (112) | 18.26 | (220) | 19.25 | 1.43 |
| Example B-9 | $Li_2(Ba_{0.25}Ca_{0.25}Na_{0.50})Ti_{5.50}Nb_{0.50}O_{14}$ | Orthorhombic | Cmca | (112) | 18.24 | (220) | 19.24 | 1.38 |
| Example B-10 | $Li_2(Ba_{0.25}Mg_{0.25}Na_{0.50})Ti_{5.50}Nb_{0.50}O_{14}$ | Orthorhombic | Cmca | (112) | 18.22 | (220) | 19.21 | 1.52 |
| Example B-11 | $Li_2(Ca_{0.25}Mg_{0.25}Na_{0.50})Ti_{5.50}Nb_{0.50}O_{14}$ | Orthorhombic | Cmca | (112) | 18.19 | (220) | 19.18 | 1.54 |

TABLE 7

| C series | Target Composition | Li Source/ Amount | M1 Source/ Amount | M2 Source/ Amount | Ti Source/ Amount | M3 Source/ Amount |
|---|---|---|---|---|---|---|
| Example C-1 | $Li_2(Sr_{0.75}K_{0.25})Ti_{5.75}Nb_{0.25}O_{14}$ | $Li_2CO_3/1.03$ | $SrCO_3/0.75$ | $K_2CO_3/0.125$ | $TiO_2/5.75$ | $Nb_2O_5/0.125$ |
| Example C-2 | $Li_2(Sr_{0.50}K_{0.50})Ti_{5.50}Nb_{0.50}O_{14}$ | $Li_2CO_3/1.03$ | $SrCO_3/0.50$ | $K_2CO_3/0.25$ | $TiO_2/5.50$ | $Nb_2O_5/0.25$ |
| Example C-3 | $Li_2(Sr_{0.25}K_{0.75})Ti_{5.25}Nb_{0.75}O_{14}$ | $Li_2CO_3/1.03$ | $SrCO_3/0.25$ | $K_2CO_3/0.375$ | $TiO_2/5.25$ | $Nb_2O_5/0.375$ |
| Example C-4 | $Li_2(Sr_{0.25}Cs_{0.75})Ti_{5.25}Nb_{0.75}O_{14}$ | $Li_2CO_3/1.03$ | $SrCO_3/0.25$ | $Cs_2CO_3/0.375$ | $TiO_2/5.25$ | $Nb_2O_5/0.375$ |
| Example C-5 | $Li_2(Sr_{0.50}K_{0.25}Na_{0.25})Ti_{5.50}Nb_{0.50}O_{14}$ | $Li_2CO_3/1.03$ | $SrCO_3/0.50$ | $K_2CO_3/0.125$ $Na_2CO_3/0.125$ | $TiO_2/5.50$ | $Nb_2O_5/0.25$ |
| Example C-6 | $Li_2(Sr_{0.50}Cs_{0.25}Na_{0.25})Ti_{5.50}Nb_{0.50}O_{14}$ | $Li_2CO_3/1.03$ | $SrCO_3/0.50$ | $Cs_2CO_3/0.125$ $Na_2CO_3/0.125$ | $TiO_2/5.50$ | $Nb_2O_5/0.25$ |
| Example C-7 | $Li_2(Sr_{0.50}Cs_{0.25}K_{0.25})Ti_{5.50}Nb_{0.50}O_{14}$ | $Li_2CO_3/1.03$ | $SrCO_3/0.25$ | $Cs_2CO_3/0.125$ $K_2CO_3/0.125$ | $TiO_2/5.50$ | $Nb_2O_5/0.25$ |

The products of Examples C-1 to C-7 were subjected to composition analysis and powder X-ray diffraction measurement in the same manner as in Example A series. The results are shown in the following Tables 8 and 9.

TABLE 8

| | | $Li_xM1_{1-y}M2_yTi_{6-z}M3_zO_{14}$ | | |
|---|---|---|---|---|
| C series | Composition | x | y | z |
| Example C-1 | $Li_2(Sr_{0.75}K_{0.25})Ti_{5.75}Nb_{0.25}O_{14}$ | 2.0 | 0.25 | 0.25 |
| Example C-2 | $Li_2(Sr_{0.50}K_{0.50})Ti_{5.50}Nb_{0.50}O_{14}$ | 2.0 | 0.50 | 0.50 |
| Example C-3 | $Li_2(Sr_{0.25}K_{0.75})Ti_{5.25}Nb_{0.75}O_{14}$ | 2.0 | 0.75 | 0.75 |
| Example C-4 | $Li_2(Sr_{0.25}Cs_{0.75})Ti_{5.25}Nb_{0.75}O_{14}$ | 2.0 | 0.75 | 0.75 |
| Example C-5 | $Li_2(Sr_{0.50}K_{0.25}Na_{0.25})Ti_{5.50}Nb_{0.50}O_{14}$ | 2.0 | 0.50 | 0.50 |
| Example C-6 | $Li_2(Sr_{0.50}Cs_{0.25}Na_{0.25})Ti_{5.50}Nb_{0.50}O_{14}$ | 2.0 | 0.50 | 0.50 |
| Example C-7 | $Li_2(Sr_{0.50}Cs_{0.25}K_{0.25})Ti_{5.50}Nb_{0.50}O_{14}$ | 2.0 | 0.50 | 0.50 |

TABLE 9

| | | | | Diffraction Peak L | | Diffraction Peak H | | Intensity Ratio of Diffraction Peaks |
|---|---|---|---|---|---|---|---|---|
| C series | Composition | Crystal Phase | Space Group | Plane Index | 2θ/deg | Plane Index | 2θ/deg | $I_L/I_H$ |
| Example C-1 | $Li_2(Sr_{0.75}K_{0.25})Ti_{5.75}Nb_{0.25}O_{14}$ | Orthorhombic | Cmca | (021) | 18.26 | (220) | 19.24 | 1.11 |
| Example C-2 | $Li_2(Sr_{0.50}K_{0.50})Ti_{5.50}Nb_{0.50}O_{14}$ | Orthorhombic | Cmca | (021) | 18.19 | (220) | 19.20 | 1.58 |
| Example C-3 | $Li_2(Sr_{0.25}K_{0.75})Ti_{5.25}Nb_{0.75}O_{14}$ | Orthorhombic | Fmmm | (111) | 18.14 | (202) | 19.15 | 2.61 |
| Example C-4 | $Li_2(Sr_{0.25}Cs_{0.75})Ti_{5.25}Nb_{0.75}O_{14}$ | Orthorhombic | Fmmm | (111) | 18.12 | (202) | 19.14 | 2.89 |
| Example C-5 | $Li_2(Sr_{0.50}K_{0.25}Na_{0.25})Ti_{5.50}Nb_{0.50}O_{14}$ | Orthorhombic | Fmmm | (111) | 18.20 | (202) | 19.21 | 2.31 |
| Example C-6 | $Li_2(Sr_{0.50}Cs_{0.25}Na_{0.25})Ti_{5.50}Nb_{0.50}O_{14}$ | Orthorhombic | Fmmm | (111) | 18.18 | (202) | 19.19 | 1.85 |
| Example C-7 | $Li_2(Sr_{0.50}Cs_{0.25}K_{0.25})Ti_{5.50}Nb_{0.50}O_{14}$ | Orthorhombic | Fmmm | (111) | 18.26 | (202) | 19.25 | 1.95 |

Example D

In Examples D-1 to D-16, products of Example D-1 to D-16 were obtained in the same manner as in Examples A-1 to A-12 except that, in order to obtain products having target compositions shown in the following Table 10, starting materials shown in Table 10 were used. The molar ratios of the starting materials were set to ratios shown in the following Table 10.

TABLE 10

| D series | Target Composition | Li Source/ Amount | M1 Source/ Amount | M2 Source/ Amount | Ti Source/ Amount | M3 Source/ Amount |
|---|---|---|---|---|---|---|
| Example D-1 | $Li_{2.2}(Sr_{0.9}Na_{0.1})Ti_{5.9}Al_{0.1}O_{14}$ | $Li_2CO_3/1.13$ | $SrCO_3/0.90$ | $Na_2CO_3/0.05$ | $TiO_2/5.90$ | $Al_2O_3/0.05$ |
| Example D-2 | $Li_{2.2}(Sr_{0.9}Na_{0.1})Ti_{5.9}Fe_{0.1}O_{14}$ | $Li_2CO_3/1.13$ | $SrCO_3/0.90$ | $Na_2CO_3/0.05$ | $TiO_2/5.90$ | $Fe_2O_3/0.05$ |
| Example D-3 | $Li_{2.75}(Sr_{0.25}Na_{0.75})Ti_5Zr_1O_{14}$ | $Li_2CO_3/1.42$ | $SrCO_3/0.25$ | $Na_2CO_3/0.375$ | $TiO_2/5.00$ | $ZrO_2/1.00$ |
| Example D-4 | $Li_{2.25}(Sr_{0.75}Na_{0.25})Ti_5Sn_1O_{14}$ | $Li_2CO_3/1.16$ | $SrCO_3/0.75$ | $Na_2CO_3/0.125$ | $TiO_2/5.00$ | $SnO_2/1.00$ |
| Example D-5 | $Li_{2.50}(Sr_{0.50}Na_{0.50})Ti_5Sn_1O_{14}$ | $Li_2CO_3/1.29$ | $SrCO_3/0.50$ | $Na_2CO_3/0.25$ | $TiO_2/5.00$ | $SnO_2/1.00$ |
| Example D-6 | $Li_{2.75}(Sr_{0.25}Na_{0.75})Ti_1Sn_5O_{14}$ | $Li_2CO_3/1.42$ | $SrCO_3/0.25$ | $Na_2CO_3/0.375$ | $TiO_2/1.00$ | $SnO_2/5.00$ |
| Example D-7 | $Li_2(Sr_{0.25}Na_{0.75})Ti_4Sn_{1.25}Nb_{0.75}O_{14}$ | $Li_2CO_3/1.03$ | $SrCO_3/0.25$ | $Na_2CO_3/0.375$ | $TiO_2/4.00$ | $SnO_2/1.25$ $Nb_2O_5/0.375$ |
| Example D-8 | $Li_2(Sr_{0.75}Na_{0.25})Ti_{5.75}V_{0.25}O_{14}$ | $Li_2CO_3/1.03$ | $SrCO_3/0.75$ | $Na_2CO_3/0.125$ | $TiO_2/5.75$ | $V_2O_5/0.125$ |
| Example D-9 | $Li_2(Sr_{0.5}Na_{0.5})Ti_{5.5}V_{0.5}O_{14}$ | $Li_2CO_3/1.03$ | $SrCO_3/0.50$ | $Na_2CO_3/0.25$ | $TiO_2/5.50$ | $V_2O_5/0.25$ |
| Example D-10 | $Li_2(Sr_{0.25}Na_{0.75})Ti_{5.25}V_{0.75}O_{14}$ | $Li_2CO_3/1.03$ | $SrCO_3/0.25$ | $Na_2CO_3/0.375$ | $TiO_2/5.25$ | $V_2O_5/0.75$ |

TABLE 10-continued

| D series | Target Composition | Li Source/ Amount | M1 Source/ Amount | M2 Source/ Amount | Ti Source/ Amount | M3 Source/ Amount |
|---|---|---|---|---|---|---|
| Example D-11 | $Li_2(Sr_{0.25}Na_{0.75})Ti_{5.25}Ta_{0.75}O_{14}$ | $Li_2CO_3$/1.03 | $SrCO_3$/0.25 | $Na_2CO_3$/0.375 | $TiO_2$/5.25 | $Ta_2O_5$/0.75 |
| Example D-12 | $Li_2(Sr_{0.25}Na_{0.75})Ti_{5.25}Nb_{0.74}Ta_{0.01}O_{14}$ | $Li_2CO_3$/1.03 | $SrCO_3$/0.25 | $Na_2CO_3$/0.375 | $TiO_2$/5.25 | $Nb_2O_5$/0.37 $Ta_2O_5$/0.005 |
| Example D-13 | $Li_2(Sr_{0.25}Na_{0.75})Ti_{5.25}Nb_{0.70}Ta_{0.05}O_{14}$ | $Li_2CO_3$/1.03 | $SrCO_3$/0.25 | $Na_2CO_3$/0.375 | $TiO_2$/5.25 | $Nb_2O_5$/0.35 $Ta_2O_5$/0.025 |
| Example D-14 | $Li_2(Sr_{0.25}Na_{0.75})Ti_{5.25}Nb_{0.40}Ta_{0.35}O_{14}$ | $Li_2CO_3$/1.03 | $SrCO_3$/0.25 | $Na_2CO_3$/0.375 | $TiO_2$/5.25 | $Nb_2O_5$/0.40 $Ta_2O_5$/0.175 |
| Example D-15 | $Li_2(Sr_{0.25}Na_{0.75})Ti_{5.625}Mo_{0.375}O_{14}$ | $Li_2CO_3$/1.03 | $SrCO_3$/0.25 | $Na_2CO_3$/0.375 | $TiO_2$/5.625 | $MoO_3$/0.375 |
| Example D-16 | $Li_{2.25}(Sr_{0.25}Na_{0.75})Ti_5Fe_{0.25}Nb_{0.75}O_{14}$ | $Li_2CO_3$/1.16 | $SrCO_3$/0.25 | $Na_2CO_3$/0.375 | $TiO_2$/5.00 | $Fe_2O_3$/0.125 $Nb_2O_5$/0.375 |

The products of Examples D-1 to D-16 were subjected to composition analysis and powder X-ray diffraction measurement in the same manner as in Example A series. The results are shown in the following Tables 11 and 12.

TABLE 11

| | | $Li_xM1_{1-y}M2_yTi_{6-z}M3_zO_{14}$ | | |
|---|---|---|---|---|
| D series | Composition | x | y | z |
| Example D-1 | $Li_{2.2}(Sr_{0.9}Na_{0.1})Ti_{5.9}Al_{0.1}O_{14}$ | 2.2 | 0.1 | 0.1 |
| Example D-2 | $Li_{2.2}(Sr_{0.9}Na_{0.1})Ti_{5.9}Fe_{0.1}O_{14}$ | 2.2 | 0.1 | 0.1 |
| Example D-3 | $Li_{2.75}(Sr_{0.25}Na_{0.75})Ti_5Zr_1O_{14}$ | 2.75 | 0.75 | 1.0 |
| Example D-4 | $Li_{2.75}(Sr_{0.25}Na_{0.75})Ti_5Sn_1O_{14}$ | 2.75 | 0.75 | 1.0 |
| Example D-5 | $Li_{2.25}(Sr_{0.75}Na_{0.25})Ti_5Sn_1O_{14}$ | 2.25 | 0.25 | 1.0 |
| Example D-6 | $Li_{2.75}(Sr_{0.25}Na_{0.75})Ti_1Sn_5O_{14}$ | 2.75 | 0.75 | 5.0 |
| Example D-7 | $Li_2(Sr_{0.25}Na_{0.75})Ti_4Sn_{1.25}Nb_{0.75}O_{14}$ | 2.0 | 0.75 | 2.0 |
| Example D-8 | $Li_2(Sr_{0.75}Na_{0.25})Ti_{5.75}V_{0.25}O_{14}$ | 2.0 | 0.25 | 0.25 |
| Example D-9 | $Li_2(Sr_{0.5}Na_{0.5})Ti_{5.5}V_{0.5}O_{14}$ | 2.0 | 0.5 | 0.5 |
| Example D-10 | $Li_2(Sr_{0.25}Na_{0.75})Ti_{5.25}V_{0.75}O_{14}$ | 2.0 | 0.75 | 0.75 |
| Example D-11 | $Li_2(Sr_{0.25}Na_{0.75})Ti_{5.25}Ta_{0.75}O_{14}$ | 2.0 | 0.75 | 0.75 |
| Example D-12 | $Li_2(Sr_{0.25}Na_{0.75})Ti_{5.25}Nb_{0.74}Ta_{0.01}O_{14}$ | 2.0 | 0.75 | 0.75 |
| Example D-13 | $Li_2(Sr_{0.25}Na_{0.75})Ti_{5.25}Nb_{0.70}Ta_{0.05}O_{14}$ | 2.0 | 0.75 | 0.75 |
| Example D-14 | $Li_2(Sr_{0.25}Na_{0.75})Ti_{5.25}Nb_{0.40}Ta_{0.35}O_{14}$ | 2.0 | 0.75 | 0.75 |
| Example D-15 | $Li_2(Sr_{0.25}Na_{0.75})Ti_{5.625}Mo_{0.375}O_{14}$ | 2.0 | 0.75 | 0.375 |
| Example D-16 | $Li_{2.25}(Sr_{0.25}Na_{0.75})Ti_5Fe_{0.25}Nb_{0.75}O_{14}$ | 2.25 | 0.75 | 1.0 |

TABLE 12

| | | | Space Group | Diffraction Peak L | | Diffraction Peak H | | Intensity Ratio of Diffraction Peaks $I_L/I_H$ |
|---|---|---|---|---|---|---|---|---|
| D series | Composition | Crystal Phase | | Plane Index | 2θ/deg | Plane Index | 2θ/deg | |
| Example D-1 | $Li_{2.2}(Sr_{0.9}Na_{0.1})Ti_{5.9}Al_{0.1}O_{14}$ | Orthorhombic | Cmca | (112) | 18.28 | (220) | 19.28 | 0.68 |
| Example D-2 | $Li_{2.2}(Sr_{0.9}Na_{0.1})Ti_{5.9}Fe_{0.1}O_{14}$ | Orthorhombic | Cmca | (112) | 18.31 | (220) | 19.32 | 0.61 |
| Example D-3 | $Li_{2.75}(Sr_{0.25}Na_{0.75})Ti_5Zr_1O_{14}$ | Orthorhombic | Fmmm | (111) | 18.22 | (202) | 19.23 | 0.69 |
| Example D-4 | $Li_{2.75}(Sr_{0.25}Na_{0.75})Ti_5Sn_1O_{14}$ | Orthorhombic | Cmca | (112) | 18.27 | (220) | 19.27 | 0.66 |
| Example D-5 | $Li_{2.50}(Sr_{0.50}Na_{0.50})Ti_5Sn_1O_{14}$ | Orthorhombic | Cmca | (112) | 18.21 | (220) | 19.19 | 1.46 |
| Example D-6 | $Li_{2.75}(Sr_{0.25}Na_{0.75})Ti_1Sn_5O_{14}$ | Orthorhombic | Fmmm | (111) | 18.14 | (202) | 19.11 | 3.00 |
| Example D-7 | $Li_2(Sr_{0.25}Na_{0.75})Ti_4Sn_{1.25}Nb_{0.75}O_{14}$ | Orthorhombic | Fmmm | (111) | 18.18 | (220) | 19.19 | 2.89 |
| Example D-8 | $Li_2(Sr_{0.75}Na_{0.25})Ti_{5.75}V_{0.25}O_{14}$ | Orthorhombic | Cmca | (112) | 18.24 | (220) | 19.24 | 0.65 |
| Example D-9 | $Li_2(Sr_{0.5}Na_{0.5})Ti_{5.5}V_{0.5}O_{14}$ | Orthorhombic | Cmca | (112) | 18.20 | (220) | 19.21 | 1.23 |
| Example D-10 | $Li_2(Sr_{0.25}Na_{0.75})Ti_{5.25}V_{0.75}O_{14}$ | Orthorhombic | Fmmm | (111) | 18.16 | (202) | 19.18 | 1.78 |
| Example D-11 | $Li_2(Sr_{0.25}Na_{0.75})Ti_{5.25}Ta_{0.75}O_{14}$ | Orthorhombic | Fmmm | (111) | 18.16 | (202) | 19.15 | 2.22 |
| Example D-12 | $Li_2(Sr_{0.25}Na_{0.75})Ti_{5.25}Nb_{0.74}Ta_{0.01}O_{14}$ | Orthorhombic | Fmmm | (111) | 18.16 | (202) | 19.15 | 2.21 |
| Example D-13 | $Li_2(Sr_{0.25}Na_{0.75})Ti_{5.25}Nb_{0.70}Ta_{0.05}O_{14}$ | Orthorhombic | Fmmm | (111) | 18.16 | (202) | 19.15 | 2.23 |
| Example D-14 | $Li_2(Sr_{0.25}Na_{0.75})Ti_{5.25}Nb_{0.40}Ta_{0.35}O_{14}$ | Orthorhombic | Fmmm | (111) | 18.17 | (202) | 19.16 | 2.25 |
| Example D-15 | $Li_2(Sr_{0.25}Na_{0.75})Ti_{5.625}Mo_{0.375}O_{14}$ | Orthorhombic | Fmmm | (111) | 18.18 | (202) | 19.17 | 2.50 |
| Example D-16 | $Li_{2.25}(Sr_{0.25}Na_{0.75})Ti_5Fe_{0.25}Nb_{0.75}O_{14}$ | Orthorhombic | Fmmm | (111) | 18.16 | (202) | 19.17 | 2.22 |

(Electrochemical Measurement)

Each of the products obtained in the above-mentioned Examples and Comparative Examples was subjected to electrochemical measurement according to the following procedure. Hereinafter, an example using the product of Example A-1 will be described, but the products of other Examples and Comparative Examples were also subjected to electrochemical measurement in the same manner as in the product of Example A-1.

First, the particles of the product of Example A-1 were ground so that the average particle size of particles of the product was 5 μm or less, to obtain a ground product. Next, acetylene black as a conductive agent was mixed with the active material in the proportion of 10 parts by mass based on the active material to obtain a mixture. Next, the mixture was dispersed in NMP (N-methyl-2-pyrrolidone) to obtain dispersion liquid. Polyvinylidene fluoride (PVdF) as a binder was mixed with the dispersion liquid in the proportion of 10 parts by mass based on the product of Example A-1 to prepare electrode slurry. The slurry was applied using a blade to a current collector made of an aluminum foil. This was dried at 130° C. for 12 hours under vacuum, and then rolled so that the density of an electrode layer (excluding the current collector) was 2.2 g/cm$^3$, to obtain an electrode.

Using this electrode, a metal lithium foil as a counter electrode and a nonaqueous electrolyte, an electrochemical measurement cell of Example A-1 was produced. The nonaqueous electrolyte was a 1 M solution of lithium hexafluorophosphate (LiPF$_6$) in a mixed solvent of ethylene carbonate and diethyl carbonate (1:1 in volume ratio).

The electrochemical measurement cell of Example A-1 was subjected to a charge-and-discharge test at room temperature. The charge-and-discharge test was performed with a charge-and-discharge current value of 0.2 C (hourly discharge rate) in the potential range of 1.0 V to 3.0 V with reference to the metal lithium electrode. The first absorption amount of Li in the test was defined as an initial charge capacity, and the release amount of Li was defined as an initial discharge capacity. At this time, a value obtained by dividing the initial discharge capacity by the initial charge capacity to obtain a quotient and multiplying the quotient by 100 (initial discharge capacity/initial charge capacity×100) was defined as an initial charge-and-discharge efficiency.

Next, in order to confirm that the product of Example A-1 can be stably charged and discharged, the electrochemical measurement cell of Example A-1 was subjected to 50 cycles of charge and discharge. One cycle had one charge and one discharge. The charge and discharge were performed at room temperature in the potential range of 1.0 V to 3.0 V with reference to the metal lithium electrode, at a current value of 1 C (hourly discharge rate).

In order to confirm the discharge capacity retention ratio after the 50 cycles, the electrochemical measurement cell of Example A-1 was charged and discharged again at 0.2 C (hourly discharge rate), and the capacity retention ratio was calculated with the initial discharge capacity defined as 100%.

The discharge capacity at 0.2 C and discharge capacity at 10.0 C of the electrochemical measurement cell of Example A-1 were measured. The discharge rate was calculated as the barometer of the rate performance by dividing the discharge capacity at 10.0 C obtained by the measurement by the capacity at 0.2 C similarly obtained by the measurement.

[Charge-and-Discharge Curves]

FIG. 12 shows initial charge-and-discharge curves obtained in the electrochemical measurement cells of Examples A-4, A-5, and A-6 and the electrochemical measurement cells of Comparative Examples A-1 and A-6. In FIG. 12, the curve of a solid line having symbol (1) shows the potential change of the electrode containing the orthorhombic oxide of Example A-4. The curve of a solid line having symbol (2) shows the potential change of the electrode containing the orthorhombic oxide of Example A-5. Furthermore, the curve of a solid line having symbol (3) shows the potential change of the electrode containing the orthorhombic oxide of Example A-6. The curve of a dotted line having symbol (4) shows the potential change of the electrode containing the orthorhombic oxide of Comparative Example A-1. Furthermore, the curve of a dotted line having symbol (5) shows the potential change of the electrode containing the orthorhombic oxide of Comparative Example A-6.

As apparent from FIG. 12, in the potential of the electrochemical measurement cell which was within the range of 1.0 V (vs. Li/Li$^+$) to 2.0 V (vs. Li/Li$^+$) as the effective potential range of the negative electrode, the charge-and-discharge curves of Comparative Example A-1 had potential flat parts at about 1.4 V (vs. Li/Li$^+$) and about 1.2 V (vs. Li/Li$^+$), and were stepwise charge-and-discharge curves. The product of Comparative Example A-1 showing such charge-and-discharge curves is not preferable in actuality. It is found that the product of Comparative Example A-6 have the charge-and-discharge curves each of which has a wide potential flat portion, which makes it difficult to grasp a correlation between a capacity and a potential, and causes a low reversible capacity (Li release capacity) of less than 100 mAh/g.

On the other hand, as shown in FIG. 12, each of the charge-and-discharge curves of Examples A-4, A-5, and A-6 has a continuous potential gradient within the range of 1.0 V (vs. Li/Li$^+$) to 1.6 V (vs. Li/Li$^+$). The charging state (remaining capacity) of a battery which can be charged can be estimated by determining the battery potential. That is, the continuous potential gradients which can be shown by the products of Examples A-4 to A-6 are useful in order to control the charge and discharge of the battery. Furthermore, as apparent from FIG. 12, the electrode capacitances of Examples A-4 to A-6 are higher than those of Comparative Examples A-1 and A-6. Therefore, the products of Examples A-4 to A-6 can provide a battery having a high energy density.

Although not shown in the drawings, the initial charge-and-discharge curves in each of the electrochemical measurement cells of Examples A-1 to A-3, A-7 to A-15, B-1 to B-11, C-1 to C-7, and D-1 to D-16 had a smaller stepwise charge-and-discharge curve part in the potential curves of the electrode than that of Comparative Example A-1 in the battery voltage of the electrochemical measurement cell which was within the range of 1.0 V (vs. Li/Li$^+$) to 2.0 V (vs. Li/Li$^+$), and had a continuous potential gradient, as in Examples A-4 to 6. Furthermore, these electrode capacitances of Examples were also higher than those of Comparative Examples A-1 and A-6.

Tables 13 to 16 show the initial discharge capacity, initial charge-and-discharge efficiency, 10 C/0.2 C discharge capacity ratio, capacity retention ratio after 50 cycles, electrode potential in a half charge state (50% state of charge=SOC 50% when a full charge was defined as 100%), and capacity proportion of a potential stepwise portion obtained by dividing the discharge capacity of the potential stepwise portion at a 1.2 V (vs. Li/Li$^+$) by the total discharge capacity, of each of the electrochemical measurement cells in Example A series to D series, and Comparative Examples A-1 to A-7. As the capacity proportion of the potential stepwise portion is smaller, an actual adverse effect caused by the potential stepwise can be estimated to be low. Since Comparative Example A-7 provided a monoclinic structure different from an orthorhombic structure, the electrode potential in a half charge state was 1.54 V, and a low potential as the negative electrode could not be obtained.

TABLE 13

| A series | Composition | Initial Discharge Capacity (mAh/g) | Initial Charge-and-Discharge Efficiency (%) | 10 C/0.2 C Discharge Capacity Ratio | Capacity Retention Ratio after 50 Cycles (%) | Potential in SOC50% (V vs. Li$^+$/Li) | Capacity Proportion of Potential Stepwise Portion (%) |
|---|---|---|---|---|---|---|---|
| Comparative Example A-1 | Li$_2$SrTi$_6$O$_{14}$ | 106.8 | 92.1 | 89.3 | 89.5 | 1.43 | 23.5 |
| Comparative Example A-2 | Li$_2$MgTi$_6$O$_{14}$ | 96.1 | 91.8 | 86.5 | 87.3 | 1.42 | 22.1 |
| Comparative Example A-3 | Li$_2$BaTi$_{5.9}$Al$_{0.1}$O$_{14}$ | 107.3 | 90.9 | 84.3 | 90.1 | 1.43 | 22.5 |
| Comparative Example A-4 | Li$_2$(Sr$_{0.75}$Na$_{0.25}$)Ti$_6$O$_{14}$ | 73.6 | 83.3 | 65.9 | 61.3 | 1.42 | 20.3 |
| Comparative Example A-5 | Li$_2$SrTi$_{5.25}$Nb$_{0.75}$O$_{14}$ | 60.8 | 78.5 | 68.2 | 28.3 | 1.43 | 0 |
| Comparative Example A-6 | Li$_2$Na$_2$Ti$_6$O$_{14}$ | 90.8 | 92.0 | 89.8 | 90.5 | 1.28 | 0 |
| Comparative Example A-7 | Ti$_2$Nb$_4$O$_{14}$ (TiNb$_2$O$_7$) | 261.3 | 92.3 | 88.3 | 89.8 | 1.54 | 0 |
| Example A-1 | Li$_2$(Sr$_{0.99}$Na$_{0.01}$)Ti$_{5.99}$Nb$_{0.01}$O$_{14}$ | 110.5 | 92.8 | 90.1 | 92.5 | 1.42 | 2.5 |
| Example A-2 | Li$_2$(Sr$_{0.95}$Na$_{0.05}$)Ti$_{5.95}$Nb$_{0.05}$O$_{14}$ | 112.3 | 92.5 | 90.5 | 93.0 | 1.42 | 0 |
| Example A-3 | Li$_2$(Sr$_{0.90}$Na$_{0.10}$)Ti$_{5.90}$Nb$_{0.10}$O$_{14}$ | 114.8 | 92.2 | 90.8 | 92.8 | 1.42 | 0 |
| Example A-4 | Li$_2$(Sr$_{0.75}$Na$_{0.25}$)Ti$_{5.75}$Nb$_{0.25}$O$_{14}$ | 116.7 | 92.3 | 90.7 | 93.0 | 1.42 | 0 |
| Example A-5 | Li$_2$(Sr$_{0.50}$Na$_{0.50}$)Ti$_{5.50}$Nb$_{0.50}$O$_{14}$ | 128.7 | 93.3 | 93.7 | 92.6 | 1.42 | 0 |
| Example A-6 | Li$_2$(Sr$_{0.25}$Na$_{0.75}$)Ti$_{5.25}$Nb$_{0.75}$O$_{14}$ | 133.4 | 93.5 | 93.8 | 93.6 | 1.42 | 0 |
| Example A-7 | Li$_2$(Sr$_{0.10}$Na$_{0.90}$)Ti$_{5.10}$Nb$_{0.90}$O$_{14}$ | 130.5 | 93.1 | 92.3 | 93.3 | 1.41 | 0 |
| Example A-8 | Li$_2$(Sr$_{0.05}$Na$_{0.95}$)Ti$_{5.05}$Nb$_{0.95}$O$_{14}$ | 127.9 | 92.9 | 92.5 | 93.5 | 1.42 | 0 |
| Example A-9 | Li$_2$(Sr$_{0.01}$Na$_{0.99}$)Ti$_{5.01}$Nb$_{0.99}$O$_{14}$ | 126.3 | 92.8 | 93.1 | 94.2 | 1.42 | 0 |
| Example A-10 | Li$_{2.2}$(Sr$_{0.25}$Na$_{0.75}$)Ti$_{5.25}$Nb$_{0.75}$O$_{14}$ | 135.1 | 94.2 | 93.3 | 93.5 | 1.42 | 0 |
| Example A-11 | Li$_3$(Sr$_{0.25}$Na$_{0.75}$)Ti$_{5.25}$Nb$_{0.75}$O$_{14}$ | 120.1 | 93.8 | 92.2 | 94.3 | 1.42 | 0 |
| Example A-12 | Li$_6$(Sr$_{0.25}$Na$_{0.75}$)Ti$_{5.25}$Nb$_{0.75}$O$_{14}$ | 109.0 | 92.3 | 90.6 | 93.9 | 1.42 | 0 |
| Example A-13 | Li$_2$(Sr$_{0.25}$Na$_{0.75}$)Ti$_{5.25}$Nb$_{0.75}$O$_{13.5}$ | 132.3 | 93.9 | 90.8 | 92.9 | 1.42 | 0 |
| Example A-14 | Li$_2$(Sr$_{0.25}$Na$_{0.75}$)Ti$_{5.25}$Nb$_{0.75}$O$_{14}$ | 134.8 | 92.9 | 95.9 | 94.8 | 1.42 | 0 |
| Example A-15 | Li$_2$(Sr$_{0.25}$Na$_{0.75}$)Ti$_{5.25}$Nb$_{0.75}$O$_{14}$ | 131.5 | 94.0 | 94.3 | 94.5 | 1.42 | 0 |

TABLE 14

| B series | Composition | Initial Discharge Capacity (mAh/g) | Initial Charge-and-Discharge Efficiency (%) | 10 C/0.2 C Discharge Capacity Ratio | Capacity Retention Ratio after 50 Cycles (%) | Potential in SOC50% (V vs. Li$^+$/Li) | Capacity Proportion of Potential Stepwise Portion (%) |
|---|---|---|---|---|---|---|---|
| Example B-1 | Li$_2$(Ba$_{0.75}$Na$_{0.25}$)Ti$_{5.75}$Nb$_{0.25}$O$_{14}$ | 112.8 | 92.3 | 89.9 | 91.5 | 1.43 | 0 |
| Example B-2 | Li$_2$(Ba$_{0.50}$Na$_{0.50}$)Ti$_{5.50}$Nb$_{0.50}$O$_{14}$ | 123.3 | 93.0 | 93.5 | 93.3 | 1.43 | 0 |
| Example B-3 | Li$_2$(Ba$_{0.25}$Na$_{0.75}$)Ti$_{5.25}$Nb$_{0.75}$O$_{14}$ | 131.3 | 92.9 | 93.1 | 93.6 | 1.43 | 0 |
| Example B-4 | Li$_2$(Ca$_{0.25}$Na$_{0.75}$)Ti$_{5.25}$Nb$_{0.75}$O$_{14}$ | 128.2 | 92.6 | 92.2 | 92.5 | 1.43 | 0 |
| Example B-5 | Li$_2$(Mg$_{0.25}$Na$_{0.75}$)Ti$_{5.25}$Nb$_{0.75}$O$_{14}$ | 121.5 | 92.5 | 91.9 | 93.0 | 1.43 | 0 |
| Example B-6 | Li$_2$(Sr$_{0.25}$Ba$_{0.25}$Na$_{0.50}$)Ti$_{5.50}$Nb$_{0.50}$O$_{14}$ | 118.5 | 92.1 | 92.7 | 91.6 | 1.43 | 0 |
| Example B-7 | Li$_2$(Sr$_{0.25}$Ca$_{0.25}$Na$_{0.50}$)Ti$_{5.50}$Nb$_{0.50}$O$_{14}$ | 116.5 | 92.9 | 91.1 | 92.2 | 1.43 | 0 |
| Example B-8 | Li$_2$(Sr$_{0.25}$Mg$_{0.25}$Na$_{0.50}$)Ti$_{5.50}$Nb$_{0.50}$O$_{14}$ | 119.3 | 92.4 | 90.8 | 92.0 | 1.43 | 0 |
| Example B-9 | Li$_2$(Ba$_{0.25}$Ca$_{0.25}$Na$_{0.50}$)Ti$_{5.50}$Nb$_{0.50}$O$_{14}$ | 115.7 | 92.2 | 90.6 | 92.8 | 1.43 | 0 |
| Example B-10 | Li$_2$(Ba$_{0.25}$Mg$_{0.25}$Na$_{0.50}$)Ti$_{5.50}$Nb$_{0.50}$O$_{14}$ | 118.7 | 92.4 | 90.7 | 92.5 | 1.43 | 0 |
| Example B-11 | Li$_2$(Ca$_{0.25}$Mg$_{0.25}$Na$_{0.50}$)Ti$_{5.50}$Nb$_{0.50}$O$_{14}$ | 110.4 | 92.7 | 91.7 | 92.6 | 1.43 | 0 |

TABLE 15

| C series | Composition | Initial Discharge Capacity (mAh/g) | Initial Charge-and-Discharge efficiency (%) | 10 C/0.2 C Discharge Capacity Ratio | Capacity Retention Ratio after 50 Cycles (%) | Potential in SOC50% (V vs. Li$^+$/Li) | Capacity Proportion of Potential Stepwise Portion (%) |
|---|---|---|---|---|---|---|---|
| Example C-1 | Li$_2$(Sr$_{0.75}$K$_{0.25}$)Ti$_{5.75}$Nb$_{0.25}$O$_{14}$ | 114.4 | 92.5 | 91.1 | 92.8 | 1.43 | 0 |
| Example C-2 | Li$_2$(Sr$_{0.50}$K$_{0.50}$)Ti$_{5.50}$Nb$_{0.50}$O$_{14}$ | 122.4 | 93.1 | 92.7 | 92.1 | 1.43 | 0 |
| Example C-3 | Li$_2$(Sr$_{0.25}$K$_{0.75}$)Ti$_{5.25}$Nb$_{0.75}$O$_{14}$ | 130.8 | 93.2 | 93.1 | 92.4 | 1.43 | 0 |
| Example C-4 | Li$_2$(Sr$_{0.25}$Cs$_{0.75}$)Ti$_{5.25}$Nb$_{0.75}$O$_{14}$ | 132.2 | 92.8 | 92.8 | 93.5 | 1.43 | 0 |
| Example C-5 | Li$_2$(Sr$_{0.50}$K$_{0.25}$Na$_{0.25}$)Ti$_{5.50}$Nb$_{0.50}$O$_{14}$ | 118.5 | 93.0 | 91.7 | 92.8 | 1.43 | 0 |
| Example C-6 | Li$_2$(Sr$_{0.50}$Cs$_{0.25}$Na$_{0.25}$)Ti$_{5.50}$Nb$_{0.50}$O$_{14}$ | 125.3 | 92.7 | 93.0 | 92.4 | 1.43 | 0 |
| Example C-7 | Li$_2$(Sr$_{0.50}$Cs$_{0.25}$K$_{0.25}$)Ti$_{5.50}$Nb$_{0.50}$O$_{14}$ | 121.5 | 92.9 | 92.1 | 92.4 | 1.43 | 0 |

TABLE 16

| D series | Composition | Initial Discharge Capacity (mAh/g) | Initial Charge-and-Discharge efficiency (%) | 10 C/0.2 C Discharge Capacity Ratio | Capacity Retention Ratio after 50 Cycles (%) | Potential in SOC50% (V vs. Li$^+$/Li) | Capacity Proportion of Potential Stepwise Portion (%) |
|---|---|---|---|---|---|---|---|
| Example D-1 | Li$_{2.2}$(Sr$_{0.9}$Na$_{0.1}$)Ti$_{5.9}$Al$_{0.1}$O$_{14}$ | 110.8 | 92.9 | 90.3 | 92.1 | 1.43 | 18.2 |
| Example D-2 | Li$_{2.2}$(Sr$_{0.9}$Na$_{0.1}$)Ti$_{5.9}$Fe$_{0.1}$O$_{14}$ | 109.9 | 92.6 | 91.5 | 93.3 | 1.42 | 15.3 |
| Example D-3 | Li$_{2.75}$(Sr$_{0.25}$Na$_{0.75}$)Ti$_5$Zr$_1$O$_{14}$ | 111.2 | 92.8 | 92.7 | 92.3 | 1.42 | 10.3 |
| Example D-4 | Li$_{2.25}$(Sr$_{0.75}$Na$_{0.25}$)Ti$_5$Sn$_1$O$_{14}$ | 115.5 | 92.5 | 91.1 | 92.5 | 1.42 | 12.1 |
| Example D-5 | Li$_{2.50}$(Sr$_{0.50}$Na$_{0.50}$)Ti$_5$Sn$_1$O$_{14}$ | 118.1 | 93.1 | 92.2 | 91.8 | 1.42 | 8.6 |
| Example D-6 | Li$_{2.75}$(Sr$_{0.25}$Na$_{0.75}$)Ti$_1$Sn$_5$O$_{14}$ | 108.9 | 93.0 | 92.8 | 92.3 | 1.42 | 5.2 |
| Example D-7 | Li$_2$(Sr$_{0.25}$Na$_{0.75}$)Ti$_4$Sn$_{1.25}$Nb$_{0.75}$O$_{14}$ | 124.5 | 93.2 | 93.1 | 92.5 | 1.42 | 0 |
| Example D-8 | Li$_2$(Sr$_{0.75}$Na$_{0.25}$)Ti$_{5.75}$V$_{0.25}$O$_{14}$ | 116.3 | 92.4 | 91.5 | 92.0 | 1.42 | 9.8 |
| Example D-9 | Li$_2$(Sr$_{0.5}$Na$_{0.5}$)Ti$_{5.5}$V$_{0.5}$O$_{14}$ | 113.4 | 92.2 | 91.4 | 92.8 | 1.42 | 4.3 |
| Example D-10 | Li$_2$(Sr$_{0.25}$Na$_{0.75}$)Ti$_{5.25}$V$_{0.75}$O$_{14}$ | 120.7 | 92.5 | 92.7 | 92.0 | 1.42 | 2.3 |
| Example D-11 | Li$_2$(Sr$_{0.25}$Na$_{0.75}$)Ti$_{5.25}$Ta$_{0.75}$O$_{14}$ | 109.1 | 93.3 | 92.4 | 92.1 | 1.42 | 15.2 |
| Example D-12 | Li$_2$(Sr$_{0.25}$Na$_{0.75}$)Ti$_{5.25}$Nb$_{0.74}$Ta$_{0.01}$O$_{14}$ | 134.5 | 93.8 | 94.0 | 93.9 | 1.42 | 0 |
| Example D-13 | Li$_2$(Sr$_{0.25}$Na$_{0.75}$)Ti$_{5.25}$Nb$_{0.70}$Ta$_{0.05}$O$_{14}$ | 134.0 | 93.6 | 94.1 | 94.3 | 1.42 | 0 |
| Example D-14 | Li$_2$(Sr$_{0.25}$Na$_{0.75}$)Ti$_{5.25}$Nb$_{0.40}$Ta$_{0.35}$O$_{14}$ | 128.7 | 92.8 | 92.1 | 92.5 | 1.42 | 0 |
| Example D-15 | Li$_2$(Sr$_{0.25}$Na$_{0.75}$)Ti$_{5.625}$Mo$_{0.375}$O$_{14}$ | 120.3 | 91.8 | 94.8 | 93.6 | 1.42 | 5.1 |
| Example D-16 | Li$_{2.25}$(Sr$_{0.25}$Na$_{0.75}$)Ti$_5$Fe$_{0.25}$Nb$_{0.75}$O$_{14}$ | 133.9 | 92.2 | 93.7 | 93.8 | 1.42 | 0 |

Example E

In Example E, a nonaqueous electrolyte battery was produced according to the following procedure.

(Production of Negative Electrode)

First, particles of a product of Example A-5 were ground so that the average particle size was 5 μm or less to obtain a ground product. Next, acetylene black as a conductive agent was mixed with the product in the proportion of 6 parts by mass based on the product to obtain a mixture. Next, the mixture was dispersed in NMP (N-methyl-2-pyrrolidone) to obtain dispersion liquid. Polyvinylidene fluoride (PVdF) as a binder was mixed with the dispersion liquid in the proportion of 10 parts by mass based on the product of Example A-5 to prepare a negative electrode slurry. The slurry was applied using a blade to a current collector made of an aluminum foil. This was dried at 130° C. for 12 hours under vacuum, and then rolled so that the density of an electrode layer (excluding the current collector) was 2.2 g/cm$^3$, to obtain a negative electrode.

(Production of Positive Electrode)

Acetylene black as a conductive auxiliary agent was mixed with commercially available iron phosphate lithium (LiFePO$_4$) in the proportion of 5 parts by weight to obtain a mixture. Next, the mixture was dispersed in NMP to obtain a dispersion liquid. PVdF as a binder was mixed with the dispersion liquid in the proportion of 5 parts by weight based on iron phosphate lithium to prepare a positive electrode slurry. The slurry was applied using a blade to a current collector made of an aluminum foil. This was dried at 130° C. for 12 hours under vacuum, and then rolled so that the density of an electrode layer (excluding the current collector) was 2.1 g/cm$^3$, to obtain a positive electrode.

(Production of Electrode Group)

The positive and negative electrodes produced as described above were laminated with a polyethylene separator sandwiched therebetween to obtain a laminated body. Then, the laminated body was coiled and pressed to obtain a flat-shaped coiled type electrode group. A positive electrode terminal and a negative electrode terminal were connected to the electrode group.

(Preparation of Nonaqueous Electrolyte)

As a mixed solvent, a mixed solvent of ethylene carbonate and diethyl carbonate (1:1 in volume ratio) was provided. Lithium hexafluorophosphate (LiPF$_6$) was dissolved in the solvent in the concentration of 1 M. Thus, a nonaqueous electrolyte was prepared.

(Assembly of Nonaqueous Electrolyte Battery)

A nonaqueous electrolyte battery of Example E was produced using the electrode group and the nonaqueous electrolyte which were produced as described above.

(Charge-and-Discharge Test)

The nonaqueous electrolyte battery of Example E was subjected to a charge-and-discharge test at room temperature. The charge-and-discharge test was performed in a voltage range of 1.5 V to 2.6 V as a battery voltage and at a charge-and-discharge current value of 0.2 C (hourly discharge rate).

Figure 13:
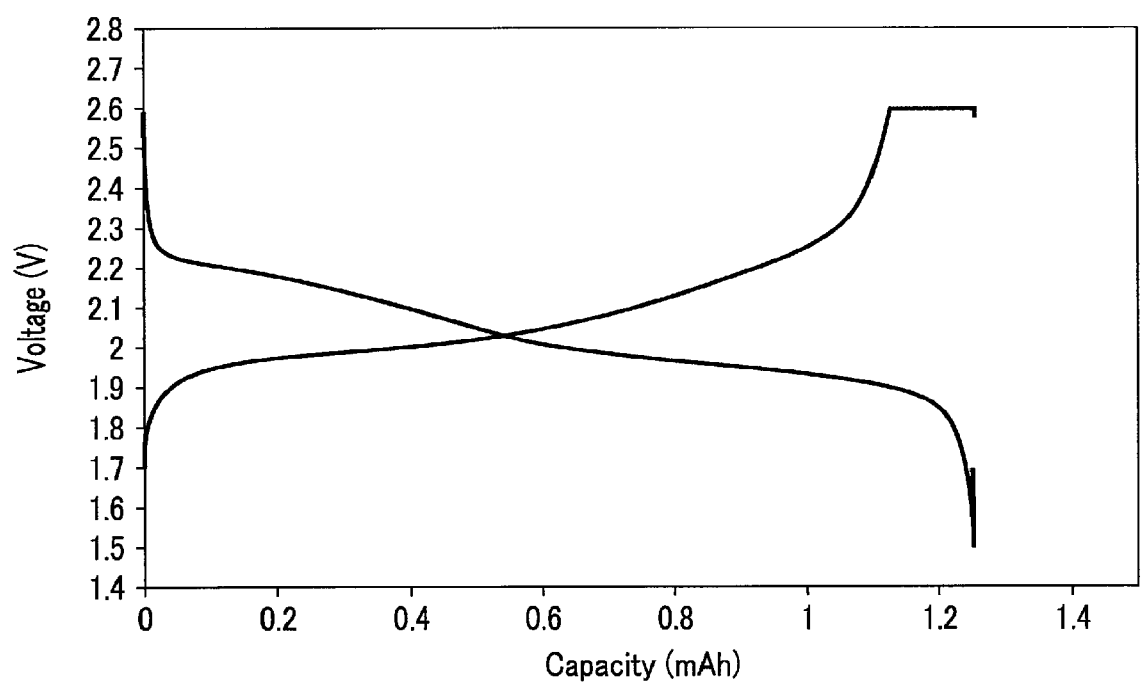
FIG. 13 shows a charge-and-discharge curve of a nonaqueous electrolyte battery of Example E.

FIG. 13 shows the charge-and-discharge curves of the nonaqueous electrolyte battery of Example E. As also apparent from FIG. 13, in the nonaqueous electrolyte battery of Example E, a voltage was smoothly changed in a voltage range of 2.3 V to 1.8 V. That is, a nonaqueous electrolyte battery in which a voltage was smoothly changed in a voltage range of 2.3 V to 1.8 V could be obtained by using the product of Example A-5. By connecting the six nonaqueous electrolyte batteries in series, a higher operating voltage range than that in the case where spinel lithium titanate (Li$_4$Ti$_5$O$_{12}$) was used for the negative electrode, that is, 13.8 V to 10.8 V can be obtained, and thereby a battery pack having a voltage compatible with a 12 V lead storage battery for automobiles can be constituted.

Example F

In Example F, a battery module of Example F was produced according to the following procedure.

First, the same five nonaqueous electrolyte batteries as that of Example E were produced according to the same procedure as that described in Example E.

Next, the produced five nonaqueous electrolyte batteries were electrically connected to each other in series. Thus, the battery module of Example F was produced.

(Charge-and-Discharge Test)

The battery module of Example F was subjected to a charge-and-discharge test at room temperature. The charge-and-discharge test was performed with a charge-and-discharge current value as 0.2 C (hourly discharge rate) in the voltage range of 7.5 V to 13.0 V as the voltage of the battery module.

Figure 14:
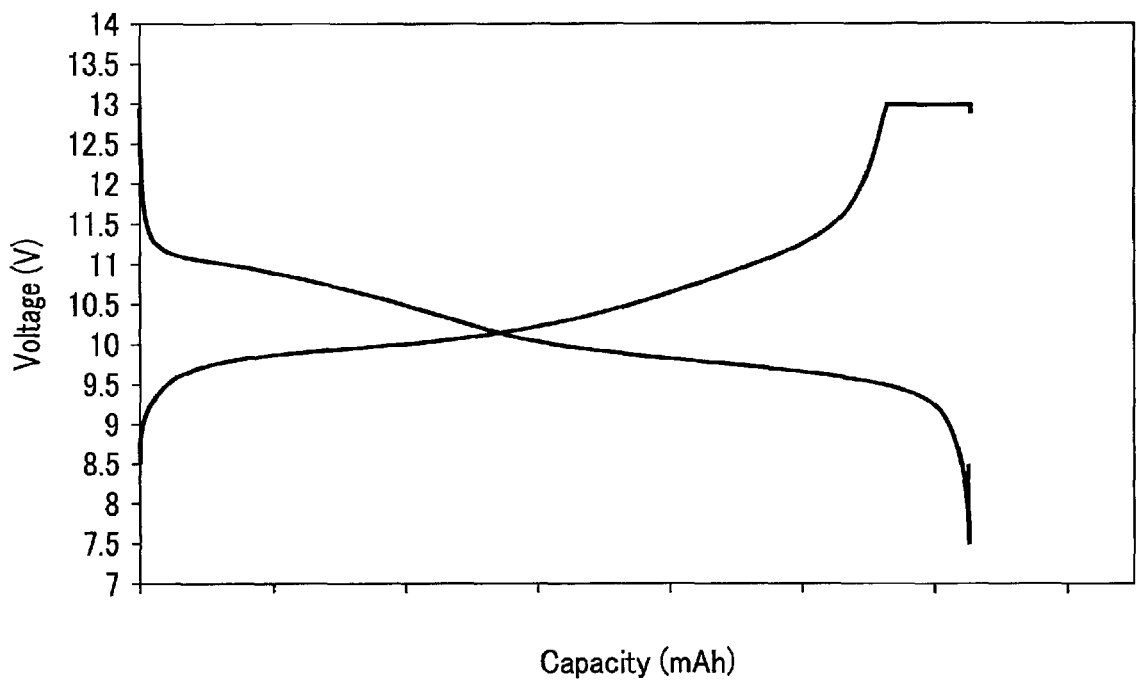
FIG. 14 shows a charge-and-discharge curve of a battery module of Example F.

FIG. 14 shows the charge-and-discharge curve of the battery module of Example F. As apparent from FIG. 14, in the battery module of Example F, a voltage was smoothly and continuously changed in a voltage range of 11.5 V to 9.0 V. That is, it was found that the battery module of Example F can be operated at 11.5 V to 9.0 V.

Thus, a battery module in which a voltage was smoothly changed in the voltage range of 11.5 V to 9.0 V could be obtained by using the nonaqueous electrolyte battery of Example E using the product of Example A-5. The operating voltage is slightly lower than that of a lead storage battery for automobiles. The battery module which can exhibit the operating voltage is used in parallel with the lead storage battery through a regulator circuit, which can protect the lead storage battery from a rapid load occurring in the lead storage battery and over-discharge when a starter motor is started according to engine starting in cold regions.

Example G

In Example G, a battery module of Example G was produced according to the following procedure.

First, the same six nonaqueous electrolyte batteries as that of Example E were produced according to the same procedure as that described in Example E. Next, the produced six nonaqueous electrolyte batteries were electrically connected to each other in series. Thus, the battery module of Example G was produced.

(Charge-and-Discharge Test)

The battery module of Example G was subjected to a charge-and-discharge test at room temperature. The charge-and-discharge test was performed with a charge-and-discharge current value as 0.2 C (hourly discharge rate) in the voltage range of 9.0 V to 15.6 V as the voltage of the battery module.

Figure 15:
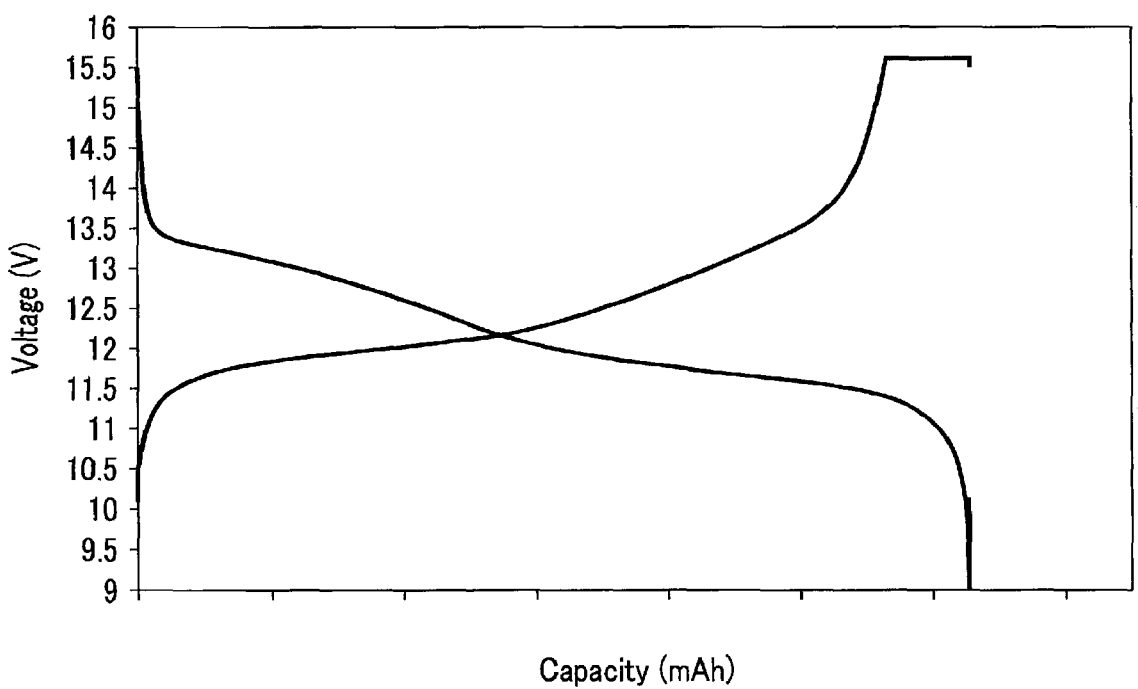
FIG. 15 shows a charge-and-discharge curve of a battery module of Example G.

FIG. 15 shows the charge-and-discharge curve of the battery module of Example G. As apparent from FIG. 15, in the battery module of Example G, a voltage was smoothly changed in a voltage range of 13.8 V to 10.8 V. That is, it was found that the battery module of Example G can be operated at 13.8 V to 10.8 V.

Thus, a battery module in which a voltage was smoothly changed in the voltage range of 13.8 V to 10.8 V could be obtained by using the nonaqueous electrolyte battery of Example E using the product of Example A-5. The operating voltage is slightly higher than that of a lead storage battery for automobiles. Thus, the battery module of Example G which can exhibit a higher operating voltage than that of the lead storage battery is used in parallel with the lead storage battery through a regulator circuit in a vehicle mounting an idling-stop system or a vehicle provided with a hybrid mechanism using a traveling motor, which can reduce a load to the lead storage battery when large current discharge or regeneration energy input is performed, and avoid deep charge-and-discharge to extend the life of the lead storage battery.

According to at least one embodiment and Example described above, an active material for a battery containing a composite oxide having an orthorhombic crystal structure is provided. The composite oxide is represented by the general formula of $Li_xM1_{1-y}M2_yTi_{6-z}M3_zO_{14+\delta}$. The composite oxide can show a smooth potential change in the potential range of 1.0 V to 1.45 V (vs. Li/Li$^+$). As a result, the active material for a battery can show a high energy density and a high battery voltage, and can realize a nonaqueous electrolyte battery having excellent life performance and providing easy voltage management.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a composite oxide having an orthorhombic crystal structure and represented by a general formula of $Li_xM1_{1-y}M2_yTi_{6-z}M3_zO_{14+\delta}$, wherein
   the M1 is at least one selected from the group consisting of Sr, Ba, Ca, and Mg;
   the M2 is at least one selected from the group consisting of Cs, K, and Na;
   the M3 is at least one selected from the group consisting of Al, Fe, Zr, Sn, V, Nb, Ta, and Mo; and
   x is within a range of $2 \leq x \leq 6$, y is within a range of $0.01 \leq y < 0.99$, z is within a range of $0.01 \leq z \leq 6$, and $\delta$ is within a range of $-0.5 \leq \delta \leq 0.5$.

2. The active material according to claim 1, wherein the M3 is at least one selected from the group consisting of trivalent Al and Fe, tetravalent Zr and Sn, pentavalent V, Nb and Ta, and hexavalent Mo.

3. The active material according to claim 1, wherein, in an X-ray diffraction diagram for the composite oxide obtained by a powder X-ray diffraction method using Cu—Kα rays, an intensity ratio $I_L/I_H$ is within a range of $0.6 \leq I_L/I_H \leq 3$, wherein the intensity $I_L$ is an intensity of a strongest diffraction peak appearing within a range of $17° \leq 2\theta \leq 18.5°$, and the intensity $I_H$ is an intensity of a strongest diffraction peak appearing within a range of $18.5° < 2\theta \leq 19.5°$.

4. The active material according to claim 1, wherein
   the orthorhombic crystal structure belongs to a space group Cmca, and
   in an X-ray diffraction diagram for the composite oxide obtained by a powder X-ray diffraction method using Cu—Kα rays, an intensity ratio $I_{L1}/T_{H1}$ is within a range of $0.6 \leq I_{L1}/I_{H1} \leq 3$, wherein the intensity $I_{L1}$ is an intensity of a diffraction peak having an intensity that is greater of intensities of diffraction peaks corresponding to a (112) plane and a (021) plane, and the intensity $I_{H1}$ is an intensity of a diffraction peak corresponding to a (220) plane.

5. The active material according to claim 1, wherein
   the orthorhombic crystal structure belongs to a space group Fmmm, and
   in an X-ray diffraction diagram for the composite oxide obtained by a powder X-ray diffraction method using Cu—Kα rays, an intensity ratio $I_{L2}/I_{H2}$ is within a range of $0.6 \leq I_{L2}/I_{H2} \leq 3$, wherein the intensity $I_{L2}$ is an intensity of a diffraction peak corresponding to a (111) plane, and the intensity $I_{H2}$ is an intensity of a diffraction peak corresponding to a (202) plane.

6. The active material according to claim 1, wherein the M1 comprises Sr and the M2 comprises Na.

7. The active material according to claim 6, wherein the composite oxide is represented by a general formula of $Li_xSr_{1-y}Na_yTi_{6-z}M3_zO_{14+\delta}$, wherein the M3 is at least one selected from the group consisting of Al, Fe, Zr, Sn, V, Nb, Ta, and Mo; and x is within a range of 2≤x≤6, y is within a range of 0.01≤y≤0.99, z is within a range of 0.01≤z≤6, and δ is within a range of −0.5≤δ≤0.5.

8. The active material according to claim 1, wherein the M3 comprises Nb.

9. The active material according to claim 1, wherein the composite oxide is a particle, the active material further comprises a layer covering at least a part of a surface of the particle of the composite oxide, and the layer comprises carbon and/or lithium titanate.

10. A nonaqueous electrolyte battery comprising:
a negative electrode comprising the active material according to claim 1;
a positive electrode; and
a nonaqueous electrolyte.

11. A battery pack comprising the nonaqueous electrolyte battery according to claim 10.

12. A battery pack comprising nonaqueous electrolyte batteries, each of which comprises:
a negative electrode comprising the active material according to claim 1;
a positive electrode; and
a nonaqueous electrolyte,
wherein the nonaqueous electrolyte batteries are electrically connected to each other in series and/or in parallel.

13. A battery module comprises nonaqueous electrolyte batteries, each of which comprises:
a negative electrode comprising the active material according to claim 1;
a positive electrode; and
a nonaqueous electrolyte, and
wherein the nonaqueous electrolyte batteries are electrically connected to each other in series.

14. The active material according to claim 1, wherein y is within a range of 0.1≤y≤0.99.

15. The active material according to claim 1, wherein z is within a range of 0.1≤z≤6.

16. The active material according to claim 1, wherein y is within a range of 0.1≤y≤0.99, and z is within a range of 0.1≤z≤6.

17. An electrode comprising the active material according to claim 1.

18. A vehicle comprising the battery pack according to claim 11.

* * * * *